US011228624B1

(12) United States Patent
Oueslati et al.

(10) Patent No.: US 11,228,624 B1
(45) Date of Patent: Jan. 18, 2022

(54) OVERLAY DATA DURING COMMUNICATIONS SESSION

(71) Applicant: Amazon Technologies, Inc., Seattle, WA (US)

(72) Inventors: Fakher Oueslati, North York (CA); Daniel Benjamin Cassel, Toronto (CA); Anton Yafremau, Toronto (CA); Nicholas Kalkounis, Toronto (CA); Vinod K. Prasad, Monte Sereno, CA (US); Ievgen Kozhemiakin, Seattle, WA (US); Joe Thomas, Pleasanton, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/682,827

(22) Filed: Nov. 13, 2019

(51) Int. Cl.
| | |
|---|---|
| *H04L 29/06* | (2006.01) |
| *H04L 29/08* | (2006.01) |
| *H04B 1/3827* | (2015.01) |
| *H04L 12/911* | (2013.01) |
| *H04N 5/45* | (2011.01) |
| *G06F 21/62* | (2013.01) |
| *G06F 16/22* | (2019.01) |
| *H04N 21/47* | (2011.01) |
| *G10L 15/22* | (2006.01) |

(Continued)

(52) U.S. Cl.
CPC .......... *H04L 65/1069* (2013.01); *G06F 16/22* (2019.01); *G06F 21/6218* (2013.01); *G10L 15/1815* (2013.01); *G10L 15/22* (2013.01); *G10L 15/30* (2013.01); *H04B 1/385* (2013.01); *H04L 47/827* (2013.01); *H04L 65/60* (2013.01); *H04L 67/306* (2013.01); *H04N 5/45* (2013.01); *H04N 21/47* (2013.01); *G10L 2015/088* (2013.01); *G10L 2015/223* (2013.01)

(58) Field of Classification Search
CPC ... H04L 65/1069; H04L 65/60; H04L 67/306; H04L 47/827; H04N 21/47; H04N 5/45; H04B 1/385; G06F 21/6218; G06F 16/22; G10L 15/1815; G10L 2015/088; G10L 2015/223; G10L 15/30; G10L 15/22
See application file for complete search history.

(56) References Cited

U.S. PATENT DOCUMENTS

| | | | |
|---|---|---|---|
| 8,811,964 B2 * | 8/2014 | Fish | ................... H04L 65/1069 455/417 |
| 9,443,518 B1 * | 9/2016 | Gauci | .................... G10L 15/26 |

(Continued)

FOREIGN PATENT DOCUMENTS

WO    WO 2013/004567 A1 *   1/2013

*Primary Examiner* — Patrice L Winder
(74) *Attorney, Agent, or Firm* — Pierce Atwood LLP

(57) ABSTRACT

A system may overlay real-time data and other data (e.g., measurement data, sensor data, etc.) over image data during a communication session. For example, the system may perform media processing on image data being sent between devices in order to overlay the real-time data and other information received from input devices (e.g., sensors, diagnostic devices, connected health devices, etc.) on top of image data during the communication session. For example, a patient may video conference with a doctor and real-time diagnostic information from a device attached to the patient (e.g., wearable device or other input device) may be overlaid on the video to display relevant information during the video conference.

19 Claims, 22 Drawing Sheets

(51) Int. Cl.
   *G10L 15/18*   (2013.01)
   *G10L 15/30*   (2013.01)
   *G10L 15/08*    (2006.01)

(56) References Cited

U.S. PATENT DOCUMENTS

| | | | | |
|---|---|---|---|---|
| 9,491,206 | B2* | 11/2016 | Nur | A61B 5/747 |
| 9,532,004 | B1* | 12/2016 | Metter | H04N 7/155 |
| 9,762,729 | B1* | 9/2017 | Sales | H04L 65/1069 |
| 9,832,308 | B1* | 11/2017 | Rogers | H04L 65/80 |
| 9,843,606 | B1* | 12/2017 | Vendrow | H04L 65/403 |
| 9,916,866 | B2* | 3/2018 | Wouhaybi | H04N 21/8455 |
| 10,531,247 | B2* | 1/2020 | Kashef | H04L 65/1069 |
| 10,567,584 | B2* | 2/2020 | Amir | H04L 65/4007 |
| 2005/0021625 | A1* | 1/2005 | Fujimura | H04N 7/147 |
| | | | | 709/204 |
| 2013/0147903 | A1* | 6/2013 | Weiser | H04L 65/403 |
| | | | | 348/14.08 |
| 2016/0099984 | A1* | 4/2016 | Karagiannis | H04L 65/1083 |
| | | | | 709/206 |
| 2016/0220198 | A1* | 8/2016 | Proud | H04W 4/70 |
| 2016/0302666 | A1* | 10/2016 | Shaya | H04L 65/403 |
| 2018/0247713 | A1* | 8/2018 | Rothman | G16H 50/30 |
| 2018/0296143 | A1* | 10/2018 | Anderson, III | A61B 5/4815 |
| 2018/0365383 | A1* | 12/2018 | Bates | G16H 40/20 |
| 2020/0145240 | A1* | 5/2020 | Jaber | G06Q 10/101 |

\* cited by examiner

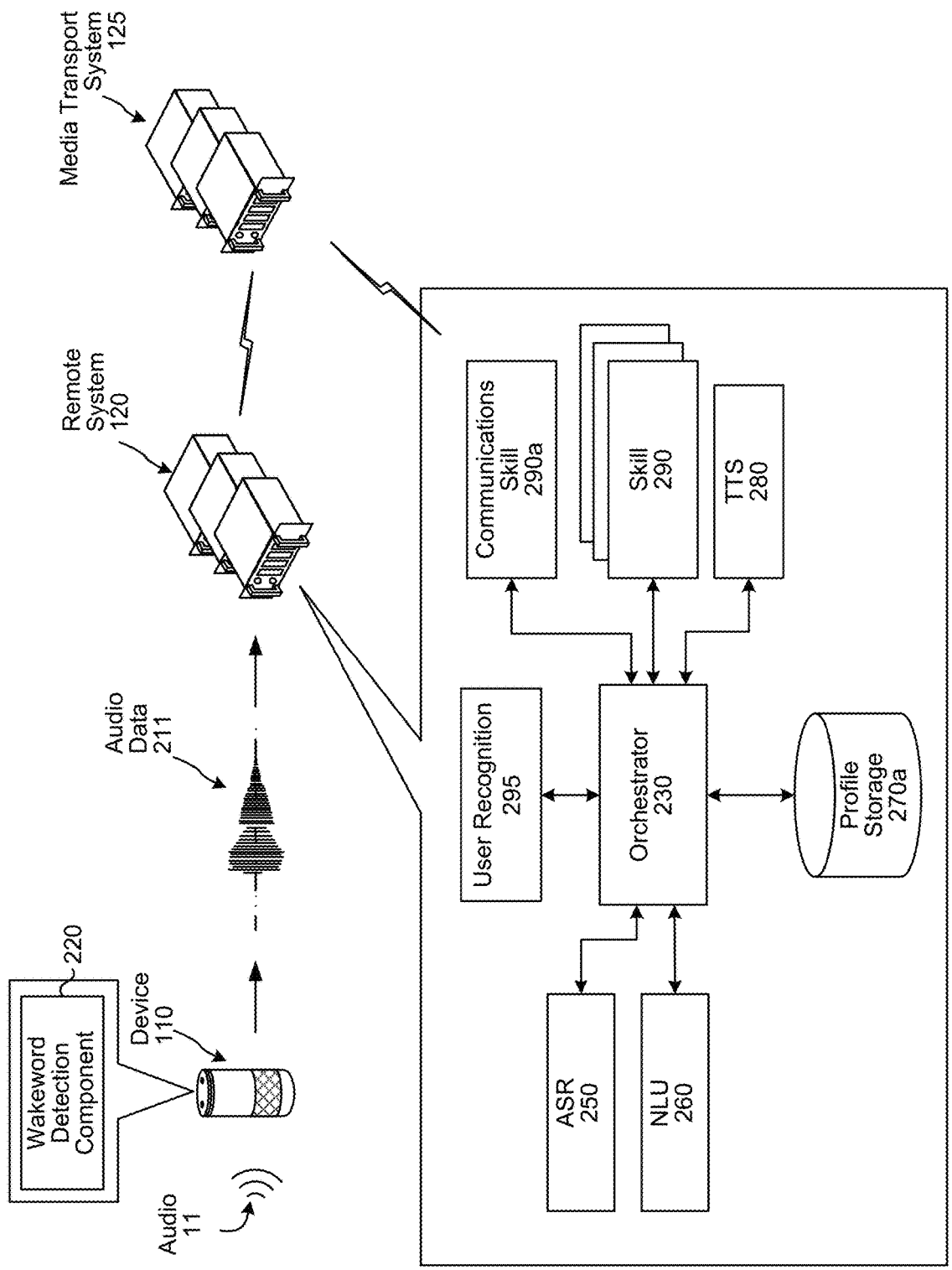

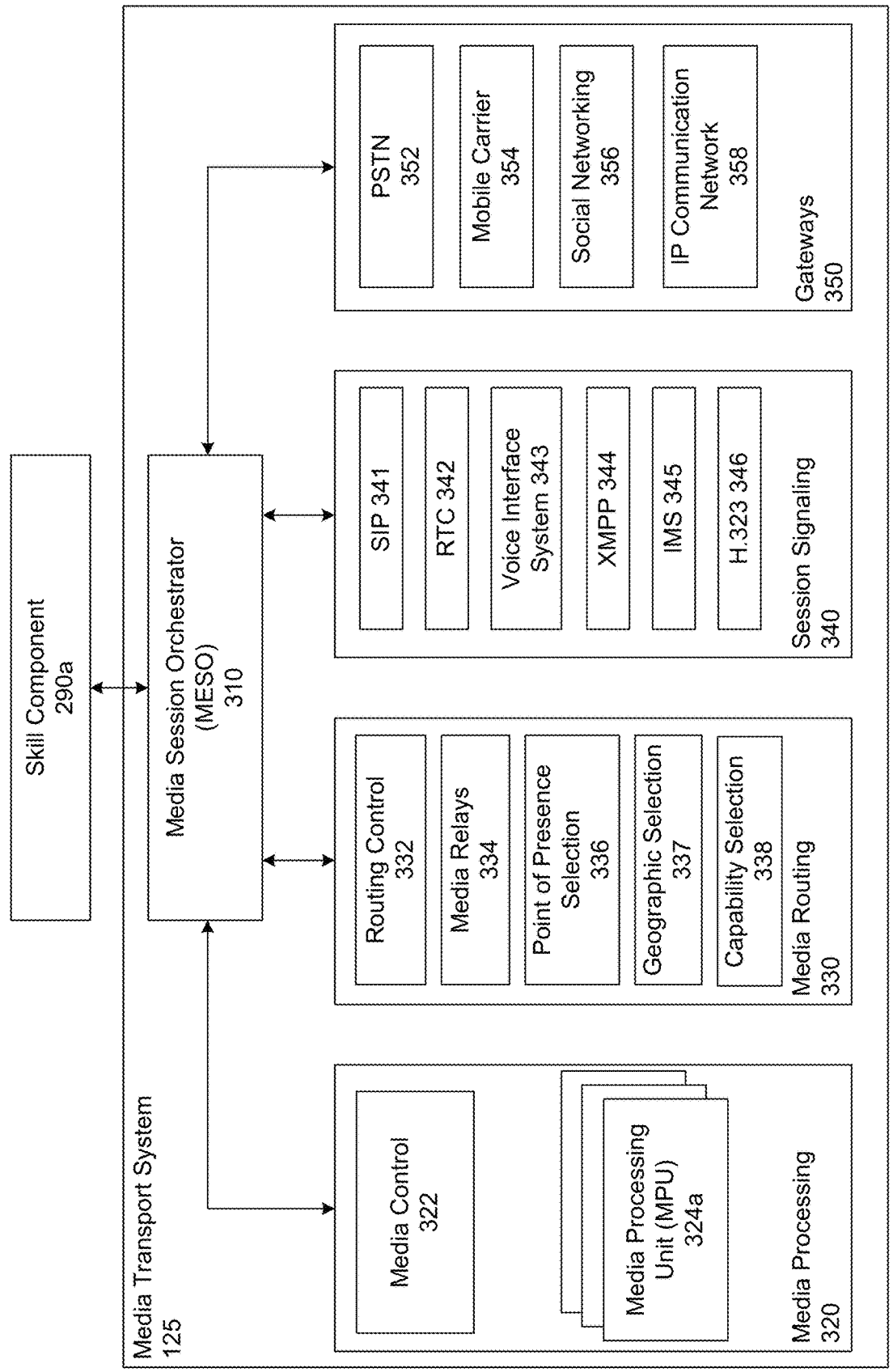

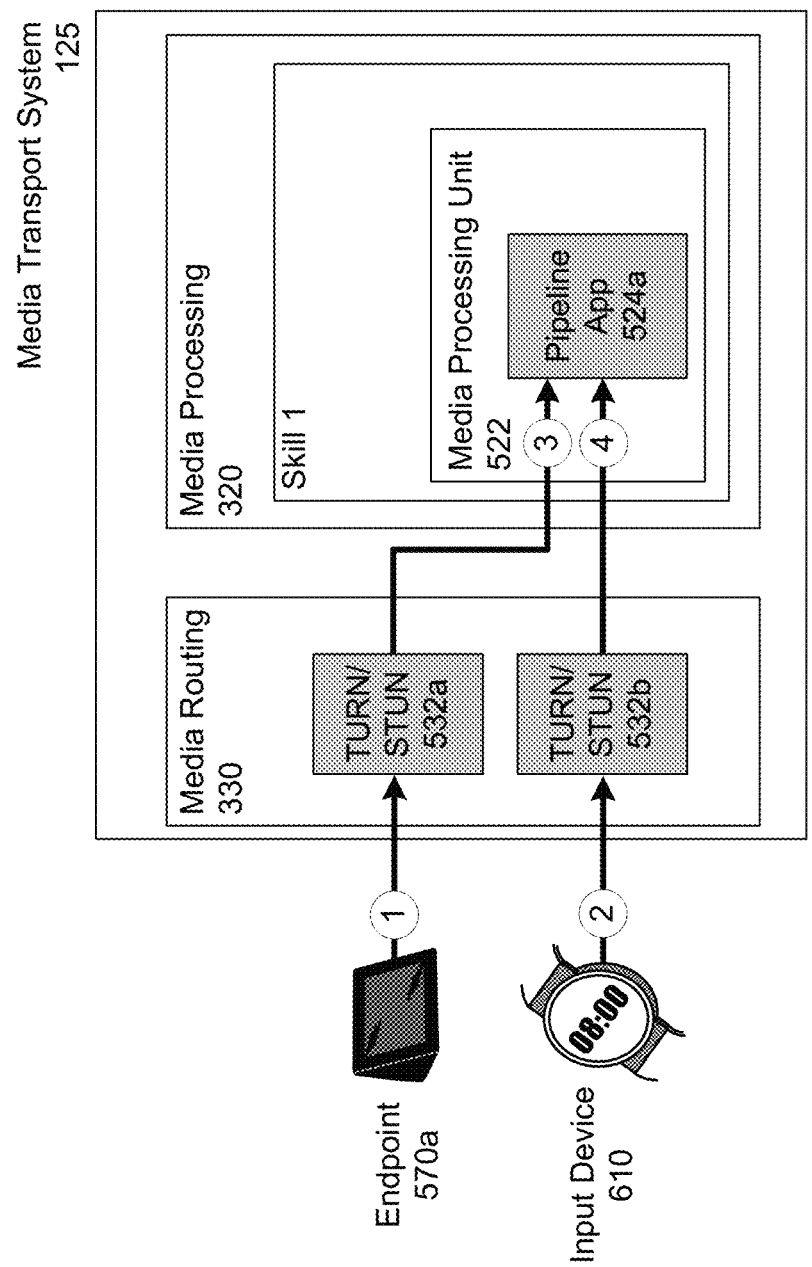

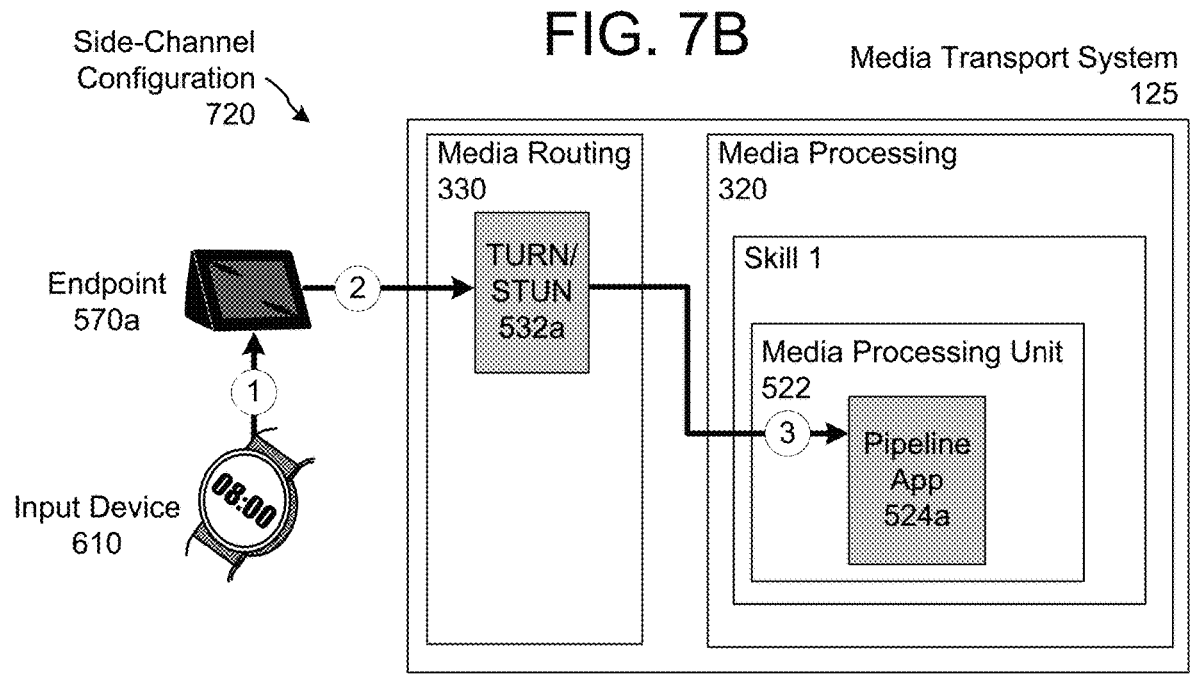
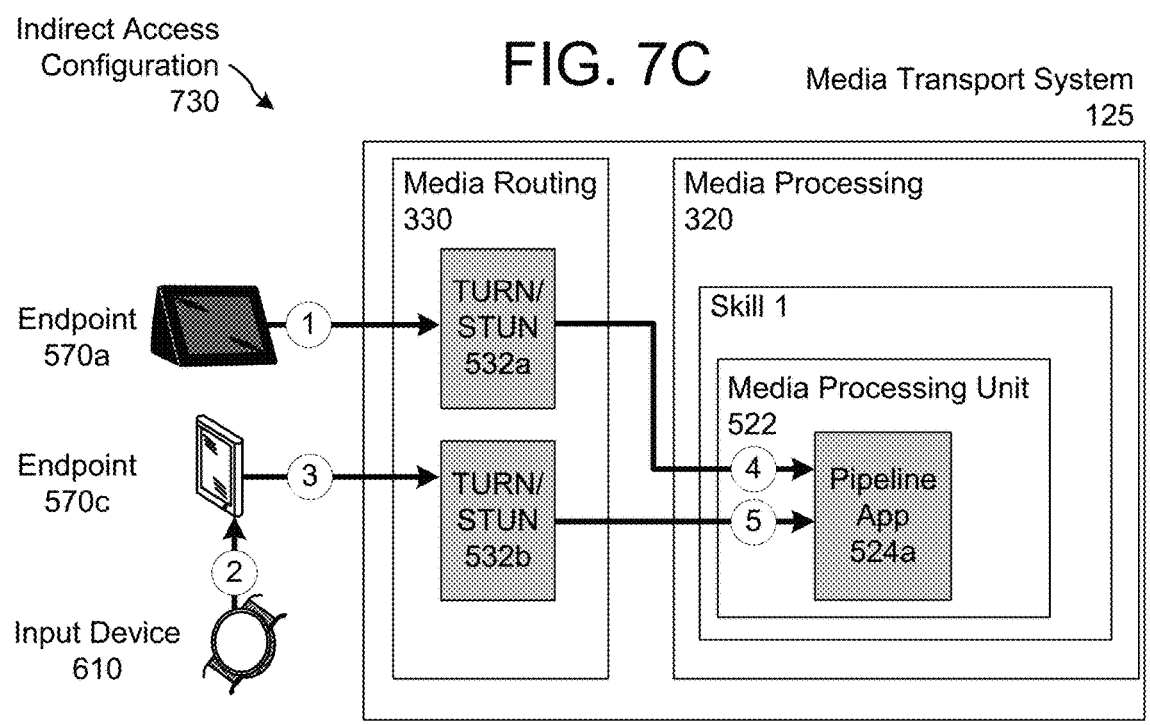

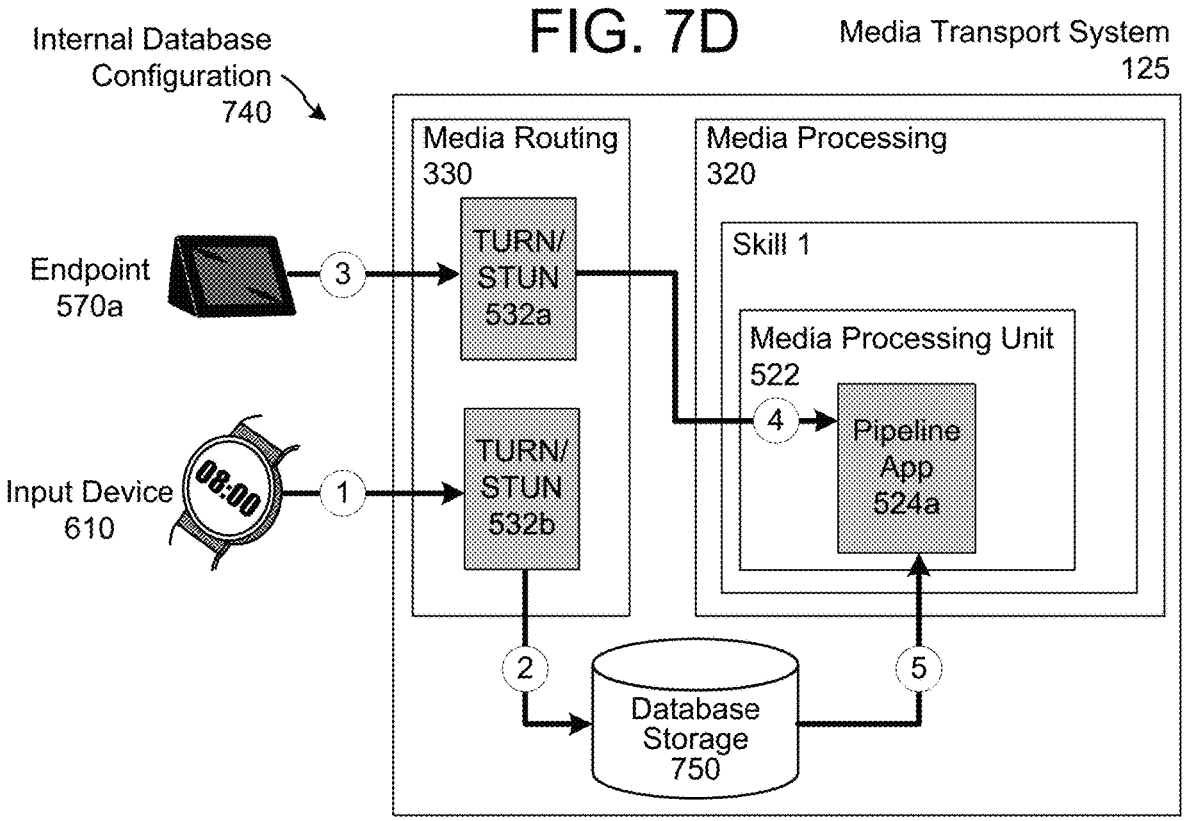
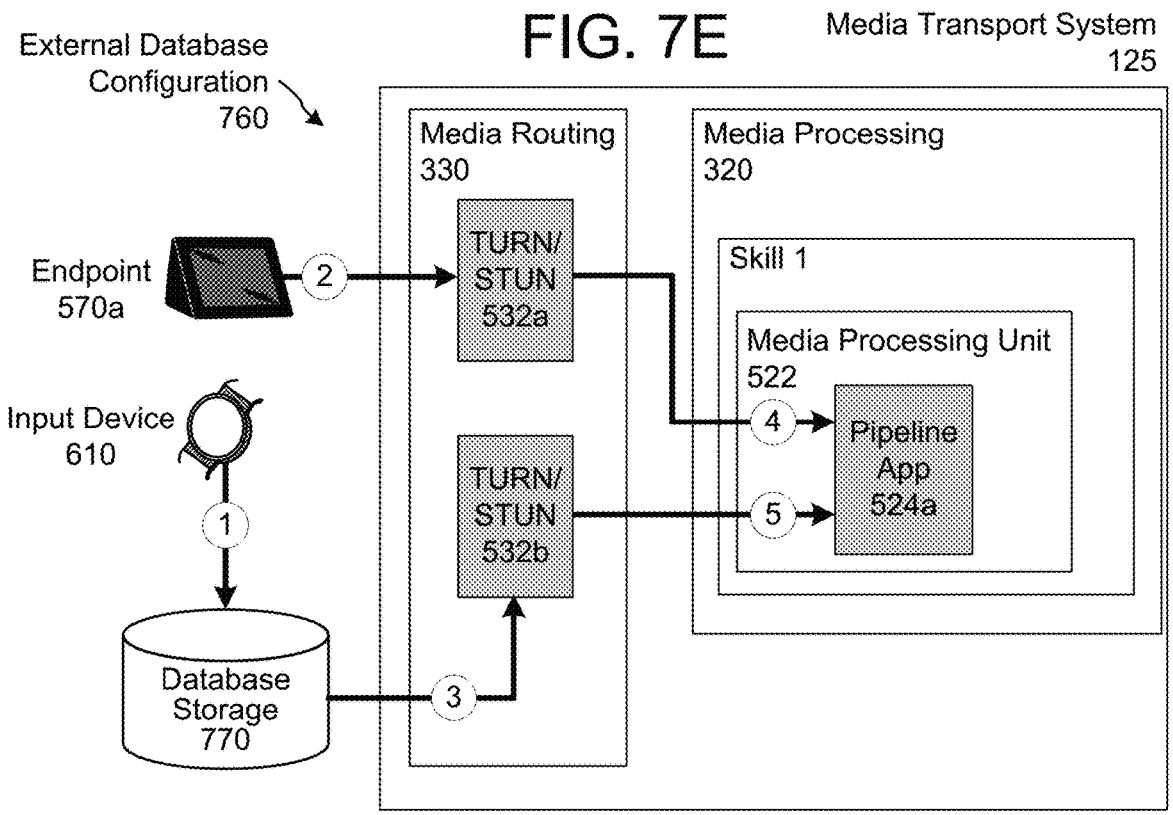

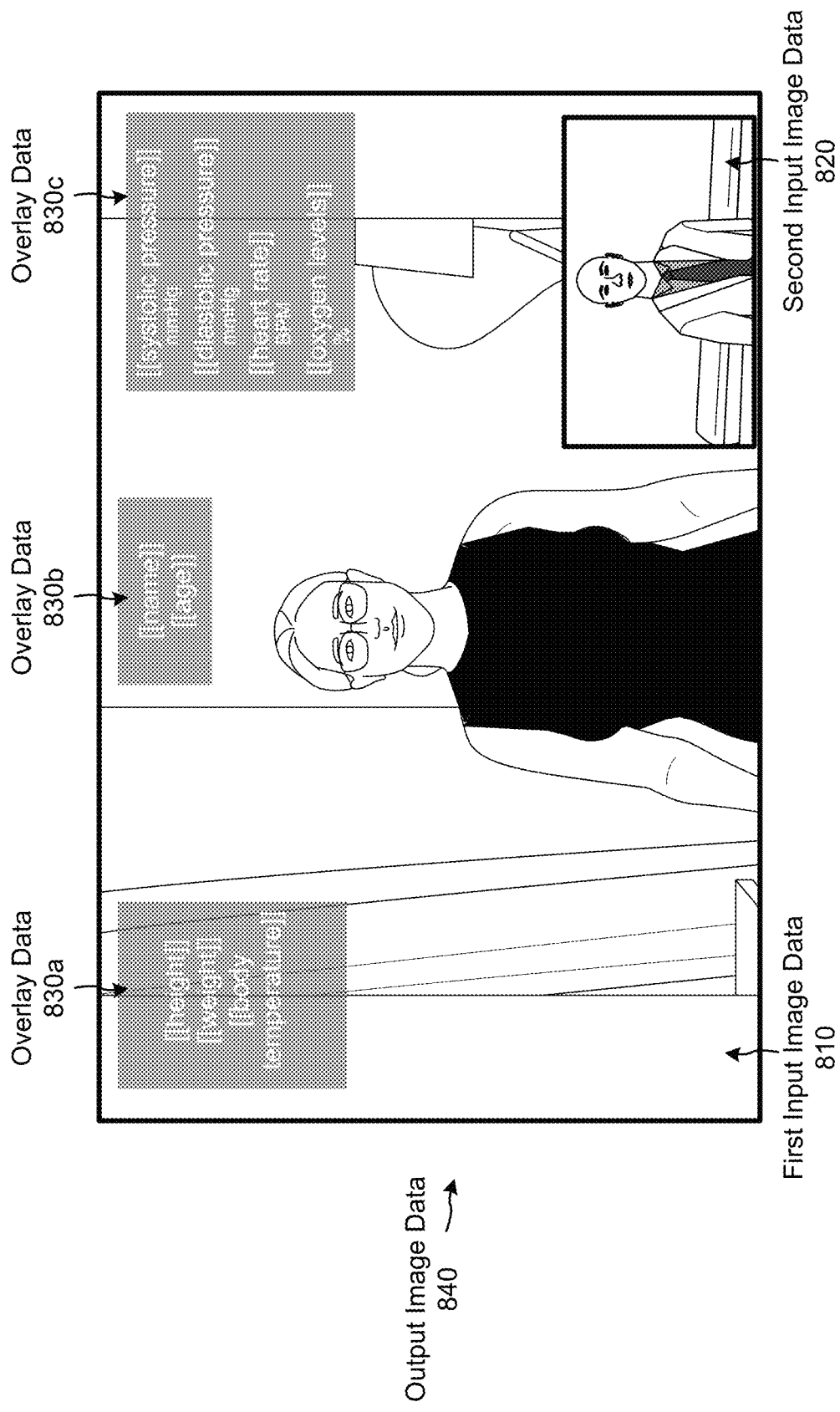

FIG. 9C
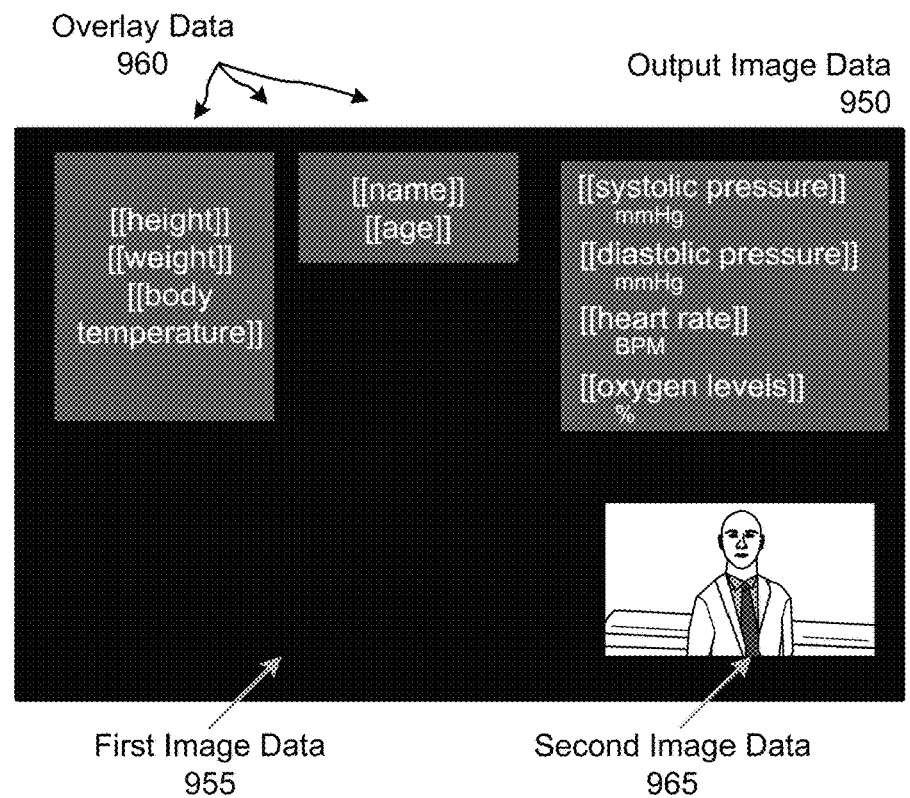
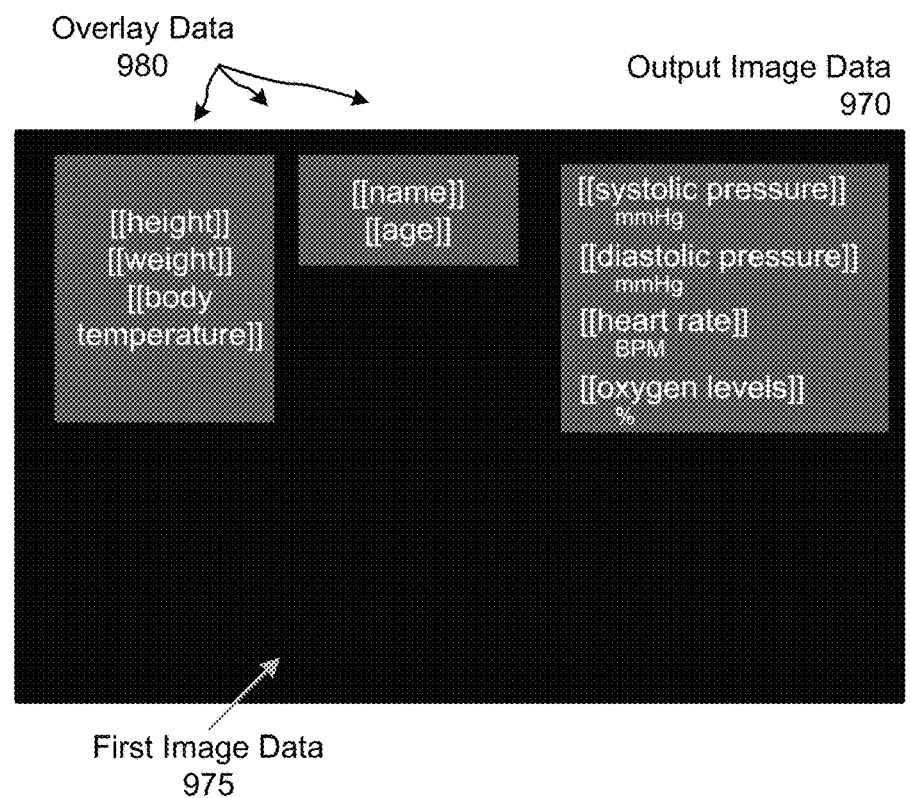

OVERLAY DATA DURING COMMUNICATIONS SESSION

BACKGROUND

With the advancement of technology, the use and popularity of electronic devices has increased considerably. Electronic devices are commonly used to capture and send audio data and/or image data.

BRIEF DESCRIPTION OF DRAWINGS

For a more complete understanding of the present disclosure, reference is now made to the following description taken in conjunction with the accompanying drawings.

FIG. 2 is a conceptual diagram of components of a system according to embodiments of the present disclosure.

FIGS. 3A-3B illustrate example component diagrams of a media transport system configured to perform media processing according to embodiments of the present disclosure.

FIGS. 7A-7E illustrate examples of input device configurations according to embodiments of the present disclosure.

FIG. 8 illustrates an example of output image data according to embodiments of the present disclosure.

FIGS. 9A-9C illustrate examples of additional output image data according to embodiments of the present disclosure.

DETAILED DESCRIPTION

Electronic devices are commonly used to capture and send audio data and/or image data. Described herein are, among other things, new technology that enable a variety of different data networks and signaling protocols to establish a communication session among multiple devices and/or route data among the multiple devices during the communication session.

To improve communication sessions and media processing, devices, systems and methods are disclosed that present real-time data and other data (e.g., measurement data, sensor data, etc.) during a communication session. For example, a media transport system may include media routing components that send data to media processing components during a communication session. The media processing components may overlay or otherwise cause presentation of the real-time data and/or other information received from input devices (e.g., sensors, diagnostic devices, connected health devices, etc.) with other data during the communication session. For example, a patient may video conference with a doctor and real-time diagnostic information from a device attached to the patient (e.g., wearable device or other input device) may be overlaid on the video to display relevant information during the video conference.

Figure 1:
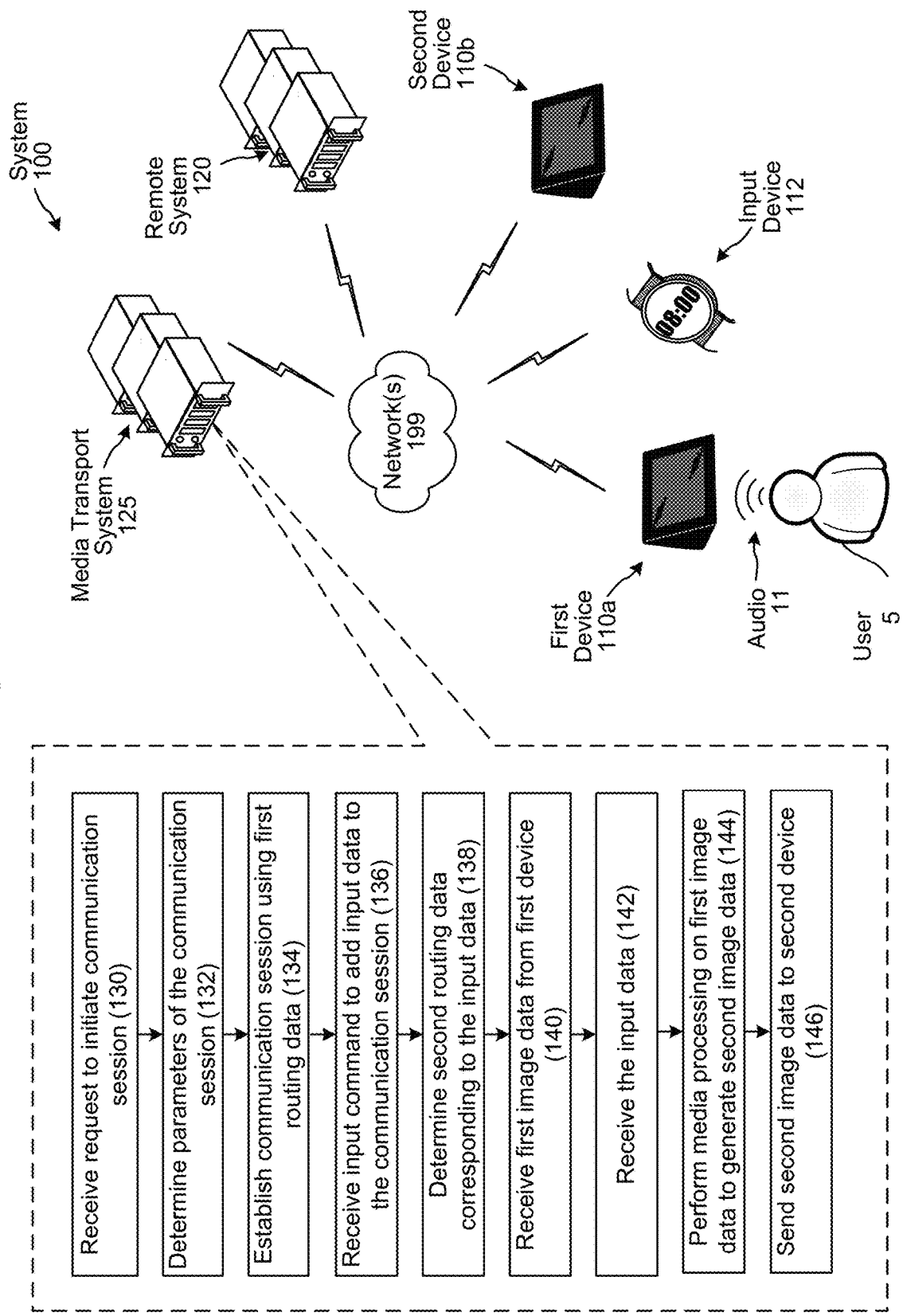
FIG. 1 is a conceptual diagram of a system configured to perform overlay media processing during a communication session according to embodiments of the present disclosure.

FIG. 1 illustrates a system configured to perform media processing to present data during a communication session according to embodiments of the present disclosure. Although the figures and discussion of the present disclosure illustrate certain operational steps of the system in a particular order, the steps described may be performed in a different order (as well as certain steps removed or added) without departing from the intent of the disclosure. While the below description describes the steps of FIG. 1 being performed by the media transport system 125, one skilled in the art will appreciate that the device(s) 110 and/or the remote system 120 may perform some or all of the steps described with respect to FIG. 1 without departing from the present disclosure.

As illustrated in FIG. 1, a first device 110*a* may be associated with a user 5 and may communicate with a second device 110*b*, an input device 112, a remote system 120, and/or a media transport system 125 using one or more networks 199. If the user 5 would like to start a conversation with a remote user associated with the second device 110*b*, the user 5 may generate a request to initiate a communication session with the second device 110*b*. As will be described in greater detail below, the media transport system 125 may initiate and manage the communication session between the first device 110*a* and the second device 110*b*, which may include audio data and/or image data (e.g., image(s) and/or video(s)).

During the communication session, the media transport system 125 may perform media processing to modify the image data being sent between the two devices 110. For example, the media transport system 125 may receive input data from the input device 112 and may overlay or otherwise cause presentation of the input data on first image data received from the first device 110*a*. Thus, the media processing components may present real-time data and/or other information received from input device 112 (e.g., sensors, diagnostic devices, connected health devices, etc.) on top of the first image data. To illustrate an example, the media transport system 125 may enable a patient (first user 5*a*) to initiate a communication session (e.g., video conference) with a doctor (e.g., second user 5b) and the media transport system 125 may present real-time diagnostic information received from an input device 112 attached to the patient (e.g., wearable device or other input device) on the first image data to display relevant information during the communication session.

For ease of illustration, the following description refers to the media transport system 125 overlaying (e.g., presenting) the input data on top of image data received from one or more devices 110. For example, during a communication session that involves video, the media transport system 125 may display the input data in addition to image data that represents the video (e.g., first image data received from the first device 110a, second image data received from the second device 110b, and/or the like). However, the disclosure is not limited thereto and the media transport system 125 may present the input data during an audio-only communication session without departing from the disclosure. Thus, the media transport system 125 may present the input data on top of fixed image data and/or may generate output image data without receiving image data from the devices 110. For example, if the communication session only includes audio data coming from the first device 110a, the media transport system 125 may present the input data on top of image data that corresponds to the first device 110a (e.g., image indicating the first device 110a), image data that corresponds to a first user profile associated with the first device 110a (e.g., image representing the first user profile), generic image data (e.g., image used whenever image data is not received from the first device 110a, which may be identical for multiple devices, user profiles, etc.), blank image data (e.g., blank image, such as a monotone image on which the input data is displayed), and/or the like without departing from the disclosure.

As used herein, overlay data may refer to a graphical representation of the input data. For example, the media transport system 125 may generate overlay data representing the input data and present the overlay data on top of image data received from the one or more devices 110. However, as described above, the disclosure is not limited thereto and instead the media transport system 125 may generate output image data without receiving input image data from the one or more devices 110. For example, the media transport system 125 may generate output image data using the overlay data and optionally blank image data (e.g., monotone image), generic image data (e.g., image used for multiple devices and/or user accounts), fixed image data (e.g., single image corresponding to the first device 110a and/or the first user profile), and/or the like without departing from the disclosure. Additionally or alternatively, the media transport system 125 may generate the output image data using only the overlay data itself without departing from the disclosure. Thus, the overlay data may correspond to any graphical representation of the input data regardless of whether the graphical representation is overlaid on top of underlying image data or presented individually without departing from the disclosure.

As illustrated in FIG. 1, in some examples the first device 110a may be a speech-controlled device and may detect audio 11 spoken by a user 5. The first device 110a may determine the audio 11 includes a wakeword and may then send audio data corresponding to the audio 11 to the remote system 120. The remote system 120 may receive the audio data from the first device 110a and process the audio data, for example using speech processing such as automatic speech recognition (ASR) processing, natural language understanding (NLU) processing, and/or the like, to determine that the audio data represents a request to initiate a communication session with the second device 110b. Although FIG. 1 illustrates the first device 110a as a speech-controlled device, many other devices may be used without departing from the disclosure, such as a smartphone, television, computer, appliance, or other device depending on system configuration. Additionally or alternatively, the user 5 may provide input data other than audio data without departing from the disclosure. Thus, the first device 110a may send a request directly to the media transport system 125 without departing from the disclosure.

In one example, the remote system 120 is configured to enable voice commands (e.g., perform ASR, NLU, etc. to identify a spoken command included in audio data), whereas the media transport system 125 is configured to enable communication sessions (e.g., using session initiation protocol (SIP) or the like). For example, the media transport system 125 may send SIP messages to endpoints (e.g., recipient devices) in order to establish a communication session for sending and receiving audio data and/or image data (e.g., image(s) and/or video(s)). The communication session may use network protocols such as real-time transport protocol (RTP), RTP Control Protocol (RTCP), Web Real-Time communication (WebRTC), and/or the like to send data packets (e.g., User Datagram Protocol (UDP) data packets). For example, the media transport system 125 may send SIP messages to initiate a single RTP media stream between two endpoints (e.g., direct RTP media stream between the first device 110a and the second device 110b) and/or to initiate and facilitate RTP media connections between the two endpoints (e.g., RTP media streams between the first device 110a and the media transport system 125 and between the media transport system 125 and the second device 110ab). During a communication session, the media transport system 125 may initiate multiple media streams, with a first media stream corresponding to data (e.g., audio data and/or image data) sent from the first device 110a to the second device 110b and a second media stream corresponding to data sent from the second device 110b to the first device 110a, although for ease of explanation this may be illustrated as a single RTP media stream.

The media transport system 125 may include logic to convert commands received from the remote system 120 into SIP requests/responses and may handle sending outgoing SIP requests and sending responses to incoming SIP requests. For ease of explanation, the disclosure illustrates the system using SIP. However, the disclosure is not limited thereto and the system may use any communication protocol for signaling and/or controlling communication sessions without departing from the disclosure. Similarly, while some descriptions of the communication sessions refer only to audio data, the disclosure is not limited thereto and the communication sessions may include audio data, image data, video data, and/or any other multimedia data without departing from the disclosure.

As illustrated in FIG. 1, the media transport system 125 may receive (130) a request to initiate a communication session. For example, the media transport system 125 may receive a request from the first device 110a to initiate a communication session between the first device 110a and the second device 110b. The media transport system 125 may determine (132) parameters of the communication session, and may establish (134) the communication session using first routing data.

In some examples, the media transport system 125 may send a communication request to each of the participants (e.g., one or more devices associated with the participants, such as second device 110b), may determine the first routing data for the communication session, and may establish the communication session using the first routing data. For example, the media transport system 125 may determine network address(es), telephone number(s), and other routing information and may use network components to route data between the first device 110a and the second device 110b. While FIG. 1 illustrates an example in which a single device (e.g., second device 110b) is associated with the second participant, the disclosure is not limited thereto and the media transport system 125 may send the communication request to multiple devices for a single participant without departing from the disclosure. For example, the media transport system 125 may send the communication request to two or more devices, with the second participant choosing to answer using the second device 110b.

During the communication session, the media transport system 125 may receive (136) an input command (e.g., directive, action, etc.) to add input data to the communication session and may determine (138) second routing data corresponding to the input data. For example, the media transport system 125 may receive a command to add the input device 112 to the communication session, such that the second routing data enables the input device 112 to join the communication session as a participant. However, the disclosure is not limited thereto and the media transport system 125 may instead receive a command to overlay data received from the input device 112 and/or a database associated with the input device 112 without departing from the disclosure. Thus, the communication session may include the first device 110a and the second device 110b, although the communication session is enhanced using the input data received from the input device 112.

While FIG. 1 illustrates the input device 112 as a smart watch, the disclosure is not limited thereto and the input device 112 may be any device configured to generate measurement data, sensor data, other real-time information, and/or the like. In some examples, the input device 112 may receive input data from any sensor 114 known to one of skill in the art, including measurement data (e.g., height, weight, temperature, heart rate, blood pressure, oxygen levels, etc.), which may also be referred to as diagnostic data, and/or the like. Additionally or alternatively, the input device 112 may correspond to a smartphone or other mobile device and the input data may comprise information stored on the mobile device without departing from the disclosure.

The media transport system 125 may receive (140) first image data from the first device 110a and may receive (142) the input data originating at the input device 112. For example, the first image data may represent a first image of the first user 5a, and the input data may be received directly from the input device 112, indirectly via a device connected to the input device 112, from a database configured to store data associated with the input device 112, and/or the like without departing from the disclosure.

The media transport system 125 may perform (144) media processing on the first image data and the input data to generate second image data and may send (146) the second image data to the second device 110b. For example, the media transport system 125 may perform media processing to present (e.g., overlay) at least a portion of the input data on the first image data during the communication session. As will be described in greater detail below, the input data may be real-time data, periodic data, and/or historical data retrieved from a database without departing from the disclosure. While FIG. 1 only illustrates the media processing being performed in a single direction, the disclosure is not limited thereto and the media transport system 125 may perform media processing on data sent from the second device 110b to the first device 110a without departing from the disclosure. Additionally or alternatively, while FIG. 1 illustrates the media transport system 125 performing media processing on the first image data and the input data to generate second image data, the disclosure is not limited thereto. Instead, the media transport system 125 may perform media processing only on the input data without departing from the disclosure.

As used herein, a communication session may refer to a period of time during which two or more devices are sending and receiving data. For example, a bidirectional synchronous communication session may correspond to a video call in which a first device sends first image data to a second device and receives second image data from the second device. However, the disclosure is not limited thereto and the data may be sent asynchronously without departing from the disclosure. Additionally or alternatively, the communication session may be unidirectional, with image data being sent from the first device to the second device but not from the second device to the first device. For example, the first device may correspond to the doorbell camera and may send image data to the media transport system 125 for processing and/or to a second device so that a user 5 may view the image data.

For ease of illustration, the disclosure may refer to a communication session or a media session interchangeably. For example, a data path corresponding to a video call may be referred to as a communication session (e.g., as it enables communication between multiple devices and/or users) or a media session (e.g., as it includes media content such as image data). Thus, "communication session" is not limited to an interaction between two or more users 5 and "media session" is not limited to a unidirectional broadcast.

As used herein, media content may refer to any data known to one of skill in the art, including text data, image data, audio data, and/or the like without departing from the disclosure. Similarly, image data may represent a single image, a series of images, a single video, a collection of videos, and/or the like without departing from the disclosure. Thus, for ease of explanation, image data may be used to indicate both image data and video data without departing from the disclosure. Additionally or alternatively, image data may be embedded with audio data and/or may be associated with separate audio data without departing from the disclosure.

The system may operate using various components as described in FIG. 2. The various components may be located on same or different physical devices. Communication between various components may occur directly or across a network(s) 199.

An audio capture component(s), such as a microphone or array of microphones of the device 110, captures audio 11. The device 110 processes audio data, representing the audio 11, to determine whether speech is detected. The device 110 may use various techniques to determine whether audio data includes speech. Some embodiments may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, Hidden Markov Model (HMM) or Gaussian Mixture Model (GMM) techniques may be applied to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 220 to perform wakeword detection to determine when a user intends to speak an input to the device 110. This process may also be referred to as keyword detection, with a wakeword being a specific example of a keyword. An example wakeword is "Alexa."

Wakeword detection is typically performed without performing linguistic analysis, textual analysis, or semantic analysis. Instead, the audio data representing the audio 11 may be analyzed to determine if specific characteristics of the audio data match preconfigured acoustic waveforms, audio signatures, or other data to determine if the audio data "matches" stored audio data corresponding to a wakeword. The stored audio data may be provided by the remote system 120 and/or may be provided by the user 5.

The wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword spotting builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without MINI being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110 may wake and begin transmitting audio data 211, representing the audio 11, to the remote system 120. The audio data 211 may include data corresponding to the wakeword, or the portion of the audio data 211 corresponding to the wakeword may be removed by the device 110 prior to sending the audio data 211 to the remote system 120.

Upon receipt by the remote system 120, the audio data 211 may be sent to an orchestrator component 230. The orchestrator component 230 may include memory and logic that enable the orchestrator component 230 to transmit various pieces and forms of data to various components of the system, as well as perform other operations. The orchestrator component 230 sends the audio data 211 to an ASR component 250. The ASR component 250 transcribes the audio data 211 into text data. The text data output by the ASR component 250 represents one or more than one (e.g., in the form of an N-best list) hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 sends the text data generated thereby to an NLU component 260, for example via the orchestrator component 230. The text data sent from the ASR component 250 to the NLU component 260 may include a top scoring ASR hypothesis or may include an N-best list including multiple ASR hypotheses. An N-best list may additionally include a respective score associated with each ASR hypothesis represented therein. Each score may indicate a confidence of ASR processing performed to generate the ASR hypothesis with which the score is associated.

The NLU component 260 attempts to make a semantic interpretation of the phrases or statements represented in the text data input therein. That is, the NLU component 260 determines one or more meanings associated with the phrases or statements represented in the text data based on words represented in the text data. The NLU component 260 determines an intent (e.g., intent data) representing an action that a user desires be performed as well as pieces of the input text data that allow a device (e.g., the device 110, the remote system 120, the media transport system 125, etc.) to execute the intent. For example, if the text data corresponds to "call John," the NLU component 260 may determine an intent that the system establish a two-way communication channel between the device 110 originating the call and a device of the recipient "John." For further example, if the text data corresponds to "tell John I am on my way," the NLU component 260 may determine an intent that the system send a message to a device of the recipient "John," with the message corresponding to "I am on my way."

The NLU component 260 outputs NLU results to the orchestrator component 230. The NLU results may include an NLU hypothesis, including a representation of an intent and corresponding slotted data that may be used by a downstream component to perform the intent. Alternatively, the NLU results data may include multiple NLU hypotheses, with each NLU hypothesis representing an intent and corresponding slotted data. Each NLU hypothesis may be associated with a confidence value representing a confidence of the NLU component 260 in the processing performed to generate the NLU hypothesis associated with the confidence value.

The orchestrator component 230 may send the NLU results to an associated skill component 290. If the NLU results include multiple NLU hypotheses, the orchestrator component 230 may send a portion of the NLU results corresponding to the top scoring NLU hypothesis to a skill component 290 associated with the top scoring NLU hypothesis.

A "skill" or "skill component" may be software running on the remote system 120 that is akin to a software application running on a traditional computing device. That is, a skill component 290 may enable the remote system 120 to execute specific functionality in order to perform one or more actions (e.g., provide information to a user, display content to a user, output music, or perform some other requested action). The remote system 120 may be configured with more than one skill component 290. For example, a weather skill component may enable the remote system 120 to provide weather information, a ride sharing skill component may enable the remote system 120 to schedule a trip with respect to a ride sharing service, a restaurant skill component may enable the remote system 120 to order food with respect to a restaurant's online ordering system, a communications skill component may enable the system to perform messaging or multi-endpoint communications, etc. A skill component 290 may operate in conjunction between the remote system 120 and other devices such as the device 110 or a media transport system 125 in order to complete certain functions. Inputs to a skill component 290 may come from various interactions and input sources. The media transport system 125 may include a communication orchestrator component 298 for orchestrating communication with the remote system 120 and/or device(s) 110.

The functionality described herein as a skill or skill component may be referred to using many different terms, such as an action, bot, app, application, speechlet or the like. A skill component 290 may include hardware, software, firmware, or the like that may be dedicated to the particular skill component 290 or shared among different skill components 290. A skill component 290 may be part of the remote system 120 (as illustrated in FIG. 2) or may be located at whole (or in part) with one or more separate systems. Unless expressly stated otherwise, reference to a skill, skill device, or skill component may include a skill component operating within the remote system 120 (for example as skill component 290) and/or skill component operating within a system separate from the remote system 120.

A skill component 290 may be configured to perform one or more actions. A skill may enable a skill component 290 to execute specific functionality in order to provide data or produce some other output requested by a user. A particular skill component 290 may be configured to execute more than one skill. For example, a weather skill may involve a weather skill component providing weather information to the remote system 120, a ride sharing skill may involve a ride sharing skill component scheduling a trip with respect to a ride sharing service, an order pizza skill may involve a restaurant skill component ordering pizza with respect to a restaurant's online ordering system, etc.

A skill component 290 may implement different types of skills. Types of skills include home automation skills (e.g., skills that enable a user to control home devices such as lights, door locks, cameras, thermostats, etc.), entertainment device skills (e.g., skills that enable a user to control entertainment devices such as smart TVs), video skills, flash briefing skills, gaming skills, as well as custom skills that are not associated with any pre-configured type of skill.

The remote system 120 may include a TTS component 280 that generates audio data (e.g., synthesized speech) from text data using one or more different methods. In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The remote system 120 may include profile storage 270a and/or the media transport system 125 may include profile storage 270b. The profile storage 270a/270b may include a variety of information related to individual users, groups of users, etc. that interact with the system. The profile storage 270a/270b may include one or more user profiles, with each user profile being associated with a different user identifier. Each user profile may include various user identifying information. Each user profile may also include preferences of the user. Each user profile may also include one or more device identifiers, representing one or more devices of the user.

The profile storage 270a/270b may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the component(s) of the system(s) and/or user are located. Permissions may be obtained from a user associated with the device 110, or other devices discussed herein.

The remote system 120 may include a user recognition component 295 that recognizes one or more users associated with data input to the system. The user recognition component 295 may take as input the audio data 211 and/or text data output by the ASR component 250. The user recognition component 295 determines scores indicating whether user input originated from a particular user. For example, a first score may indicate a likelihood that the user input originated from a first user, a second score may indicate a likelihood that the user input originated from a second user, etc. The user recognition component 295 also determines an overall confidence regarding the accuracy of user recognition operations. The user recognition component 295 may perform user recognition by comparing audio characteristics in the audio data 211 to stored audio characteristics of users. The user recognition component 295 may also perform user recognition by comparing biometric data (e.g., fingerprint data, iris data, etc.), received by the system in correlation with the present user input, to stored biometric data of users. The user recognition component 295 may further perform user recognition by comparing image data (e.g., including a representation of at least a feature of a user), received by the system in correlation with the present user input, with stored image data including representations of features of different users. The user recognition component 295 may perform additional user recognition processes, including those known in the art. Output of the user recognition component 295 may include a single user identifier corresponding to the most likely user that originated the present user input. Alternatively, output of the user recognition component 295 may include an N-best list of user identifiers with respective scores indicating likelihoods of respective users originating the present user input. The output of the user recognition component 295 may be used to inform NLU processing as well as processing performed by other components of the system.

Figure 3B:
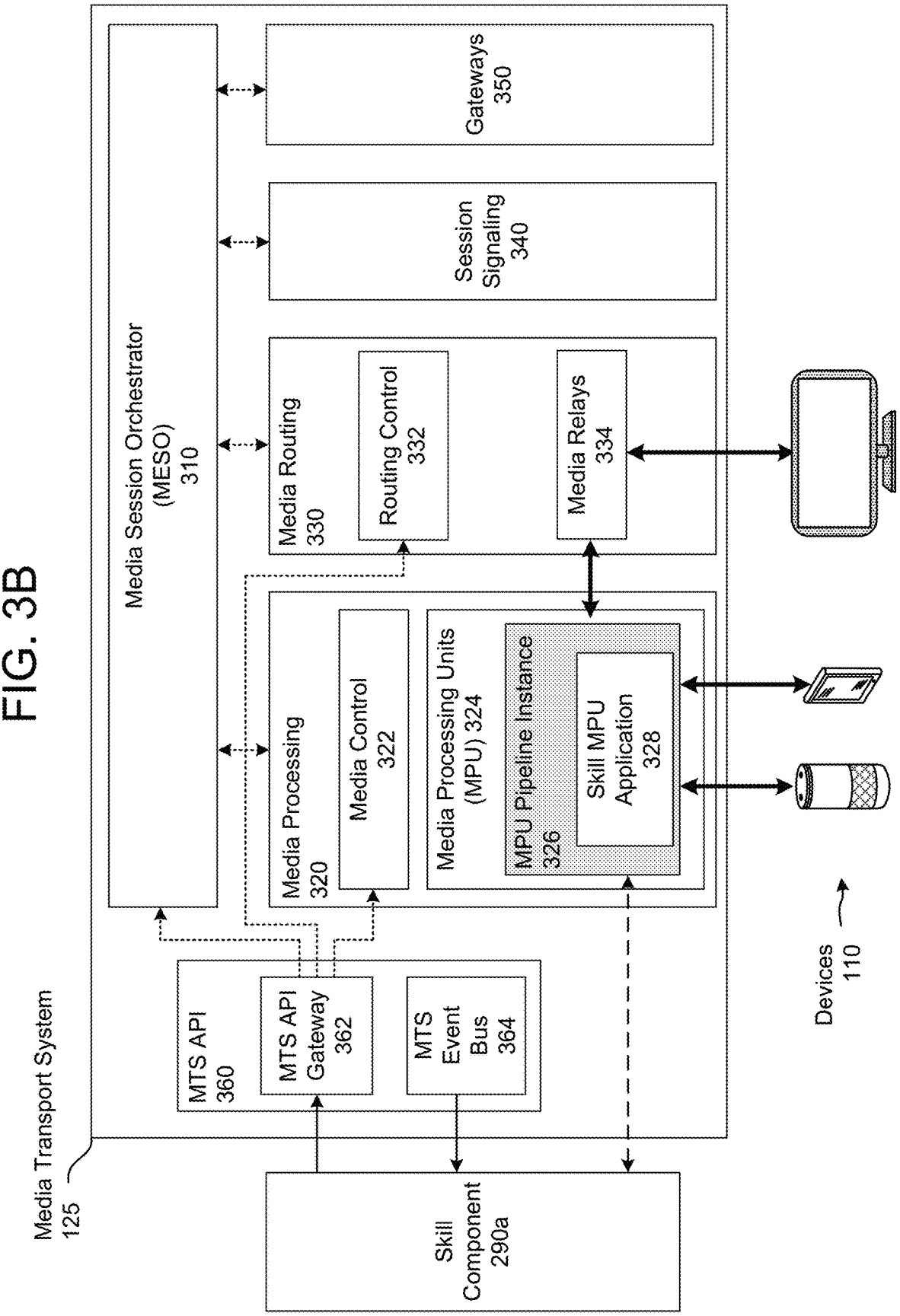

FIGS. 3A-3B illustrate example component diagrams of a media transport system configured to perform media processing according to embodiments of the present disclosure. As illustrated in FIG. 3A, a skill component 290a (e.g., specific skill configured to support communication sessions on the device 110) may interact with a media transport system 125 to request and utilize resources available within the media transport system 125. For example, the skill component 290a may correspond to an application (e.g., process, skill, and/or the like) running on a local device (e.g., device 110) and/or one or more servers, and the skill component 290a may enable a user 5 to interact with the media transport system 125 to initiate and manage a communication session involving media processing, although the disclosure is not limited thereto. To illustrate an example, the user 5 may input a command to an application programming interface (API) for the skill component 290a that is running on the device 110. The device 110 may send a request corresponding to the command to the one or more servers associated with the skill component 290a and the one or more servers may send the request to the media transport system 125.

In some examples, the skill component 290a may be developed (e.g., programmed) by an internal client or other development team (e.g., developer, programmer, and/or the like) to perform specific functionality. Thus, the skill component 290a may be designed to utilize specific resources available within the media transport system 125 and a finished product is made available to the public (e.g., end-user such as user 5). For example, the skill component 290a may enable the user 5 to initiate and/or participate in a communication session (e.g., group conference call, such as videoconferencing), to consume media content (e.g., streaming video data) with unique functionality or processing, and/or perform additional functionality (e.g., perform computer vision processing on image data, speech processing on audio data, machine learning, and/or the like) without departing from the disclosure. In this example, the media transport system 125 provides a simplified interface that enables the internal client to utilize resources within the skill component 290a, but the interface and/or resources are not visible to and/or customizable by the end-user that uses the skill component 290a.

The disclosure is not limited thereto, however, and in other examples the skill component 290a may be made available for external development to third party clients and/or to individual users. Thus, the media transport system 125 may provide a simplified interface for unique programming without technical expertise. For example, an individual user 5 may customize the skill component 290a using a drag and drop graphical user interface (GUI) to enable unique functionality, enabling the user 5 to program custom routines, skills, and/or the like. To illustrate an example, the user 5 may customize the skill component 290a to receive image data generated by an image sensor, process the image data using computer vision, and then perform specific action (s). For example, the skill component 290a may be programmed so that when a device (e.g., doorbell camera) detects motion and captures image data, the skill component 290a processes the image data using facial recognition to detect authorized users (e.g., family members or other invited guests) and either performs a first action (e.g., unlock the front door when an authorized user is detected) or performs a second action (e.g., send a notification to the user 5 including image data representing an unauthorized user). Thus, the interface and/or resources associated with the media transport system 125 may be visible to and/or customizable by the end-user that uses the skill component 290a without departing from the disclosure.

To enable the skill component 290a to request and utilize resources from within the media transport system 125, the media transport system 125 may include a media session orchestrator (MESO) component 310 configured to coordinate (e.g., define, establish, manage, etc.) a communication session (e.g., media session).

As illustrated in FIG. 3A, the MESO component 310 may interface between components that fall within four distinct categories: media processing components 320, media routing components 330, session signaling components 340, and/or gateway components 350.

Media processing components 320 refers to processing media content to enable unique functionality. For example, the media transport system 125 may provide a hosted back-end that performs media processing on individual streams of data, enabling the skill component 290a to define and control how media content is processed by the media transport system 125. The media processing components 320 may correspond to real time processing (e.g., data is processed during run-time, such as while streaming video to a user 5, during a videoconference, and/or the like) or offline processing (e.g., data is processed and stored in a database for future requests, such as during batch processing) without departing from the disclosure.

The media processing components 320 may include at least one media control component 322 and/or at least one media processing unit (MPU) 324 (e.g., first MPU 324a, second MPU 324b, etc.). The media control component 322 may coordinate media processing by sending control data to and/or receiving control data from other components within the media transport system 125. For example, the MESO component 310 may send a request to the media control component 322 to launch a specific application (e.g., skill, process, etc.) to perform media processing and the media control component 322 may send a command to a corresponding MPU 324.

The MPU 324 may be configured to perform media processing to enable additional functionality. Thus, the MPU 324 may receive first data and process the first data to generate second data. As part of performing media processing, the MPU 324 may perform speech processing on audio data and/or image data, perform computer vision processing on image data, modify audio data and/or image data, apply visual effects (e.g., overlay or other graphical element(s)) to image data, and/or the like to enable interesting functionality without departing from the disclosure. For example, the MPU 324 may generate subtitles (e.g., text data) corresponding to speech represented in image data, may translate the subtitles to a different language, may perform text-to-speech processing to enable additional functionality (e.g., describing visual cues for someone that is visually impaired, replacing dialog with speech in a different language, etc.), may perform voice recognition to identify voices represented in audio data, may perform facial recognition to detect and/or identify faces represented in image data, may perform object recognition to detect and/or identify objects represented in image data, may add a graphical overlay to image data (e.g., censoring portions of the image data, adding symbols or cartoons to the image data, etc.), may perform other processing to media content (e.g., colorize black and white movies), and/or the like without departing from the disclosure.

In some examples, the media transport system 125 may perform media processing using two or more MPUs 324. For example, the media transport system 125 may perform first media processing using a first MPU 324a and perform second media processing using a second MPU 324b. To illustrate an example, a communication session may correspond to a video chat implementation that includes image data and audio data and the media transport system 125 may perform media processing in parallel. For example, the media transport system 125 may separate the image data and the audio data, performing first media processing on the image data and separately performing second media processing on the audio data, before combining the processed image data and the processed audio data to generate output data. However, the disclosure is not limited thereto, and in other examples the media transport system 125 may perform media processing in series without departing from the disclosure. For example, the media transport system 125 may process first image data using the first MPU 324a (e.g., first media processing) to generate second image data and may process the second image data using the second MPU 324b (e.g., second media processing) to generate output image data. Additionally or alternatively, the media transport system 125 may perform multiple media processing steps using a single MPU 324 (e.g., more complex media processing) without departing from the disclosure.

The media transport system 125 may include media routing components 330 that are configured to route media (e.g., send data packets) to and from the device(s) 110 via the network(s) 199. For example, the media routing components 330 may include one or more routing control components 332, media relay components 334, point of presence selection components 336, geographic selection components 337, and/or capability selection components 338. Examples of media relay components may include a Session Traversal of User Datagram Protocol (UDP) Through Network Address Translators (NATs) system (e.g., STUN system) and/or a Traversal Using relays around NAT (TURN) system, although the disclosure is not limited thereto. While FIG. 3A illustrates the media routing components 330 including the point of presence selection components 336, geographic selection components 337, and/or capability selection components 338 as separate components, this is for ease of illustration and the disclosure is not limited thereto. Instead, a single component may perform point of presence selection, geographic selection, and/or capability selection without departing from the disclosure.

In some examples, the media transport system 125 may separate the MPUs 324 from the network(s) 199 so that the MPUs 324 do not have a publicly accessible internet protocol (IP) address (e.g., cannot route outside of a local network). Thus, the system 100 may use the media relay components 334 to send the first data from a first device to the MPUs 324 and/or the second data (e.g., processed data) generated by the MPUs 324 from the MPUs 324 to a second device. For example, an individual device 110 may be associated with a specific TURN server, such that the system 100 may route data to and from the first device using a first TURN server and route data to and from the second device using a second TURN server.

While the example described above illustrates routing data to and from the media processing components 320, the media routing components 330 may be used to route data separately from the media processing components 320 without departing from the disclosure. For example, the system 100 may route data directly between devices 110 using one or more TURN servers (e.g., TURN system) without departing from the disclosure. Additionally or alternatively, the system 100 may route data using one or more STUN servers (e.g., STUN system), such as when a device 110 has a publicly accessible IP address. In some examples, the system may establish communication sessions using a combination of the STUN system and the TURN system without departing from the disclosure. For example, a communication session may be more easily established/configured using the TURN system, but may benefit from latency improvements using the STUN system. Thus, the system 100 may route data using the STUN system, the TURN system, and/or a combination thereof without departing from the disclosure.

In addition to routing data, the media routing components 330 also perform topology optimization. For example, the media routing components 330 may include geographically distributed media relay components (e.g., TURN/STUN servers) to enable the media transport system 125 to efficiently route the data packets. For example, the media routing components 330 may include a control plane that coordinates between the media relay components to select an optimum route (e.g., data path) to send the data packets. To illustrate an example, the media routing components 330 may determine a location of parties in a communication session and determine a data path that bypasses a particular country or chokepoint in the data network. In some examples, the media routing components 330 may select an enterprise specific route and only use specific connected links associated with the enterprise. Additionally or alternatively, the routing components 330 may apply machine learning models to further reduce latency by selecting the optimum route using non-geographical parameters (e.g., availability of servers, time of day, previous history, etc.).

While the description of the media relay components 334 refers to the STUN system and/or the TURN system, the disclosure is not limited thereto. Instead, the media routing components 330 may use any alternative systems known to one of skill in the art to route the data packets. For example, the media routing components 330 may use any technique that routes UDP data packets and allows the UDP data packets to traverse the NATs without departing from the disclosure. To illustrate an example, the media routing components 330 may include UDP packet forwarding and relay devices instead of the TURN system without departing from the disclosure.

The media transport system 125 may include session signaling components 340 (e.g., edge signaling, signaling network, etc.) that may be configured to coordinate signal paths (e.g., routing of data packets) and/or a type of data packets sent between the devices 110 and server(s) within the media transport system 125. For example, the session signaling components 340 may enable the devices 110 to coordinate with each other to determine how data packets are sent between the devices 110. In some examples, a signal path may correspond to a routing table that indicates a particular route or network addresses with which to route data between two devices, although the disclosure is not limited thereto. As illustrated in FIG. 3A, the session signaling components 340 may support protocols including Session Initiation Protocol (SIP) 341, Real-Time Communication (RTC) protocol 342 (e.g., WebRTC protocol), voice interface system protocol (e.g., Alexa Voice Service (AVS) protocol 343 and/or other voice user interface protocols), Extensible Messaging and Presence Protocol (XMPP) 344, IP Multimedia Core Network Subsystem (IMS) 345, H.323 standard 346, and/or the like, although the disclosure is not limited thereto.

The media transport system 125 may include gateway components 350 that enable the media transport system 125 to interface with (e.g., send/receive media content or other data) external networks. As illustrated in FIG. 3A, the gateway components 350 may include a public switched telephone network (PSTN) gateway 352, a mobile carrier gateways 354, a social networking gateway 356, an IP communication network gateway 358, and/or other gateways known to one of skill in the art. While FIG. 3A illustrates the gateway components 350 including a single gateway for each external network, this is intended for illustrative purposes only and the gateway components 350 may include multiple gateways for each external network without departing from the disclosure. For example, the gateway components 350 may include multiple PSTN gateways 352 having different locations without departing from the disclosure. Additionally or alternatively, a single type of external network may correspond to multiple external networks without departing from the disclosure. For example, the gateway components 350 may include a first mobile carrier gateway 354 corresponding to a first mobile carrier network and a second mobile carrier gateway 354b corresponding to a second mobile carrier network without departing from the disclosure. However, the disclosure is not limited thereto and two or more mobile carrier networks may share a mobile carrier gateway 354 without departing from the disclosure.

To illustrate an example of using the gateway components 350, the system 100 may use the PSTN gateway 352 to establish a communication session with a PSTN device (e.g., wired/wireless telephone, cellular phone, and/or the like that is associated with a PSTN telephone number) using the PSTN. For example, the system 100 may use the session signaling components 340 to send SIP data packets from a device 110 to a PSTN gateway 352. The PSTN gateway 352 may receive the SIP data packets, convert the SIP data packets to audio data in a different format, and send the audio data to the PSTN device via the PSTN. Thus, the gateway components 350 may include a plurality of gateways, with each gateway being associated with a specific external network and configured to act as an interface between the media transport system 125 and the external network.

FIG. 3B illustrates an example of signal paths and data flow between components within the media transport system 125. As illustrated in FIG. 3B, the skill component 290a may send data to a media transport system (MTS) application programming interface (API) 360. The MTS API 360 may include an MTS API gateway component 362 that receives the data (e.g., request) and sends data to the MESO component 310, the media processing components 320, the media routing components 330, and/or other components. For example, FIG. 3B illustrates the MTS API gateway component 362 communicating with the MESO component 310, the media control component 322, and the routing control component 332.

As described above with regard to FIG. 3A, the MESO component 310 may communicate with the media processing components 320, the media routing components 330, the session signaling components 340, and/or the gateway components 350. Internal signaling within the media transport system 125 is represented in FIG. 3B as dotted lines.

The components within the media transport system 125 may process the request received from the MTS API gateway 362 and send data to the MTS API 360 in response to processing the request. For example, components within the media transport system 125 may send data to an MTS event bus 364 of the MTS API 360 and the MTS event bus 364 may send data (e.g., event, notification, etc.) to the skill component 290a. Data sent as part of the MTS interface between the skill component 290a and the media transport system 125 is represented in FIG. 3B using a solid line.

As illustrated in FIG. 3B, the skill component 290a may communicate with the MPU 324. For example, the skill component 290a may communicate with an MPU pipeline instance 326 running within the MPU 324 that includes a skill MPU application 328. Thus, the skill component 290a may communicate directly with the skill MPU application as part of an application interface, which is represented as a dashed line in FIG. 3B. In addition to communicating with the skill component 290a, the MPU pipeline instance 326 may send data (e.g., media content) to the devices 110, either directly or via the media relay components 334.

As used herein, an MPU pipeline instance or any other instance may refer to a specific component that is executing program code; all of the logic associated with the media processing unit is running in memory in a single host, which decreases latency associated with the media processing. For example, conventional techniques for executing asynchronous workflows perform checkpointing to store data in storage components between events. Thus, when a new event occurs, the conventional techniques retrieve the stored session and loads data into the memory, resulting in a large amount of latency. As part of reducing the latency, the media transport system 125 may use the MESO component 310 to route triggers and events directly to the MPU pipeline instance that is performing the media processing, enabling the media transport system 125 to perform media processing in real-time.

Using the MESO component 310, the media transport system 125 allows skills and/or applications to enable unique functionality without requiring the skill/application to independently develop and/or program the functionality. Thus, the media transport system 125 may offer media processing operations as a service to existing skills/applications. For example, the media transport system 125 may enable a skill to provide closed captioning or other features without building a closed captioning service. Instead, the media transport system 125 may route a communication session through an MPU 324 configured to perform closed captioning. Thus, an MPU 324 configured to enable a specific feature may be utilized to enable the feature on multiple skills without departing from the disclosure.

As the MESO component 310 is capable of executing requests and commands with low latency, the media transport system 125 may utilize multiple components within a single communication session. For example, the media transport system 125 may combine multiple different components (e.g., MPUs 324 associated with one or more skills) to piece together a custom implementation enabling a combination of existing features. To illustrate an example, the media transport system 125 may build back to back SIP user engine that is customizable for a specific implementation. Thus, the MESO component 310 may mix and match different components and/or features to provide a customized experience. For example, the media transport system 125 may provide run-time containers for developing custom applications (e.g., developing and deploying custom applications), as described in greater detail below with regard to FIG. 11.

Figure 4A:
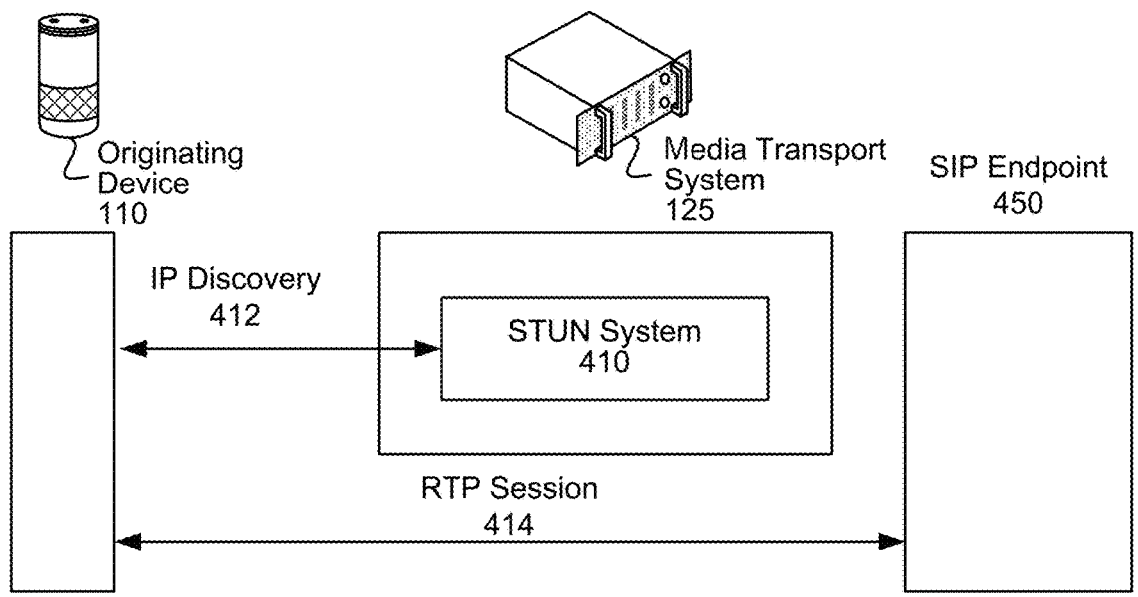
FIGS. 4A-4B illustrate examples of establishing media connections between devices according to embodiments of the present disclosure.
Figure 4B:
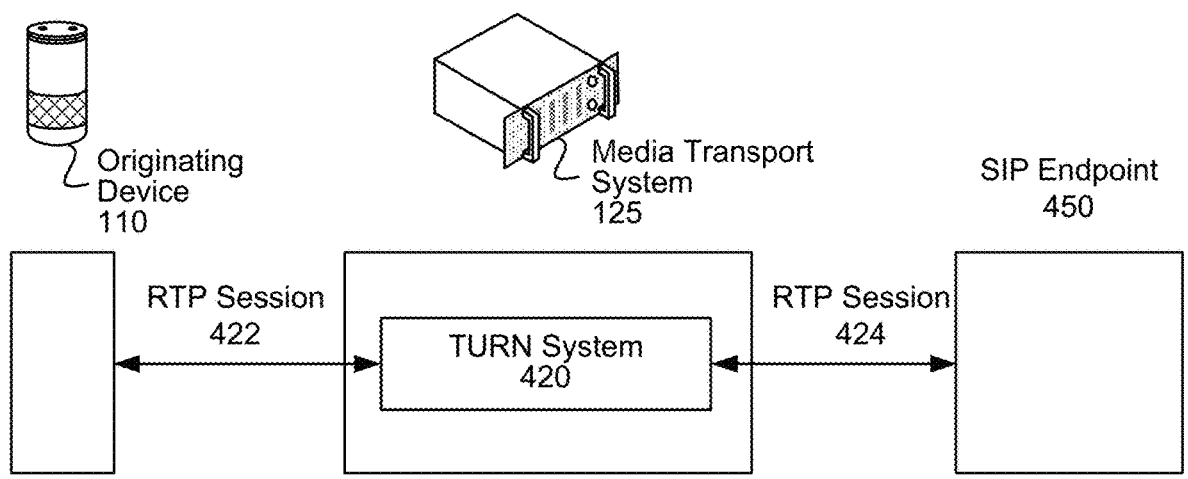

FIGS. 4A-4B illustrate examples of establishing media connections between devices according to embodiments of the present disclosure. In some examples, an originating device 110 may have a publicly accessible IP address and may be configured to establish a real-time transport (RTP) protocol communication session directly with a SIP endpoint 450. The SIP endpoint 450 may correspond to a device 110, a component within the media transport system 125, a gateway component configured to interface with a remote network, and/or a device associated with the remote network itself. To enable the originating device 110 to establish the RTP communication session, the media transport system 125 may include Session Traversal of User Datagram Protocol (UDP) Through Network Address Translators (NATs) system (e.g., STUN system 410). The STUN system 410 may be configured to allow NAT clients (e.g., an originating device 110 behind a firewall) to setup calls to a Voice over Internet Protocol (VoIP) provider hosted outside of the local network by providing a public IP address, the type of NAT they are behind, and a port identifier associated by the NAT with a particular local port. As illustrated in FIG. 4A, the originating device 110 may perform (412) IP discovery using the STUN system 410 and may use this information to set up an RTP communication session 414 (e.g., UDP communication) between the originating device 110 and the SIP endpoint 450 to establish a call.

In some examples, the originating device 110 may not have a publicly accessible IP address. For example, in some types of NAT the originating device 110 cannot route outside of the local network. To enable the originating device 110 to establish an RTP communication session, the media transport system 125 may include Traversal Using relays around NAT (TURN) system 420. The TURN system 420 may be configured to connect the originating device 110 to the SIP endpoint 450 when the originating device 110 is behind a NAT. As illustrated in FIG. 4B, the originating device 110 may establish (422) an RTP session with the TURN system 420 and the TURN system 420 may establish (424) an RTP session with the SIP endpoint 450. Thus, the originating device 110 may communicate with the SIP endpoint 450 via the TURN system 420. For example, the originating device 110 may send audio data and/or image data to the media transport system 125 and the media transport system 125 may send the audio data and/or the image data to the SIP endpoint 450. Similarly, the SIP endpoint 450 may send audio data and/or image data to the media transport system 125 and the media transport system 125 may send the audio data and/or the image data to the originating device 110.

In some examples, the system may establish communication sessions using a combination of the STUN system 410 and the TURN system 420 without departing from the disclosure. For example, a communication session may be more easily established/configured using the TURN system 420, but may benefit from latency improvements using the STUN system 410. Thus, the system may use the STUN system 410 when the communication session may be routed directly between two devices and may use the TURN system 420 for all other communication sessions. Additionally or alternatively, the system may use the STUN system 410 and/or the TURN system 420 selectively based on the communication session being established. For example, the system may use the STUN system 410 when establishing a communication session between two devices (e.g., point-to-point) within a single network (e.g., corporate LAN and/or WLAN), but may use the TURN system 420 when establishing a communication session between two devices on separate networks and/or three or more devices regardless of network(s).

When the communication session goes from only two devices to three or more devices, the system may need to transition from the STUN system 410 to the TURN system 420. Thus, if the system anticipates three or more devices being included in the communication session, the communication session may be performed using the TURN system 420. Similarly, when the communication session goes from three or more devices to only two devices, the system may need to transition from the TURN system 420 to the STUN system 410.

While FIGS. 4A-4B illustrate an RTP communication session being established between the originating device 110 and the SIP endpoint 450, the present disclosure is not limited thereto and the RTP communication session may be established between the originating device 110 and a gateway component or other device associated with the SIP endpoint 450 without departing from the present disclosure. Additionally or alternatively, while FIGS. 4A-4B illustrate examples of enabling communication sessions using the SIP protocol, the disclosure is not limited thereto and the media transport system 125 may use any protocols known to one of skill in the art.

While FIGS. 4A-4B illustrate examples of enabling communication sessions using a data connection (e.g., using Voice over Internet Protocol (VoIP), session initiation protocol (SIP), and/or the like), the disclosure is not limited thereto and the system 100 may enable communication sessions using any type of network without departing from the disclosure. For example, the remote system 120 and/or the media transport system 125 may enable communication sessions using a cellular connection (e.g., mobile phone network) or other external network without departing from the disclosure. Thus, the remote system 120 may be configured to enable voice commands (e.g., perform ASR, NLU, etc. to identify a spoken command included in audio data), whereas the media transport system 125 may be configured to enable communication sessions using the cellular connection. For example, the media transport system 125 may send commands (e.g., command data) to endpoints (e.g., caller devices, such as the device 110) instructing the endpoint to establish a communication session (e.g., dial a telephone number) in response to the voice command.

Figure 5:
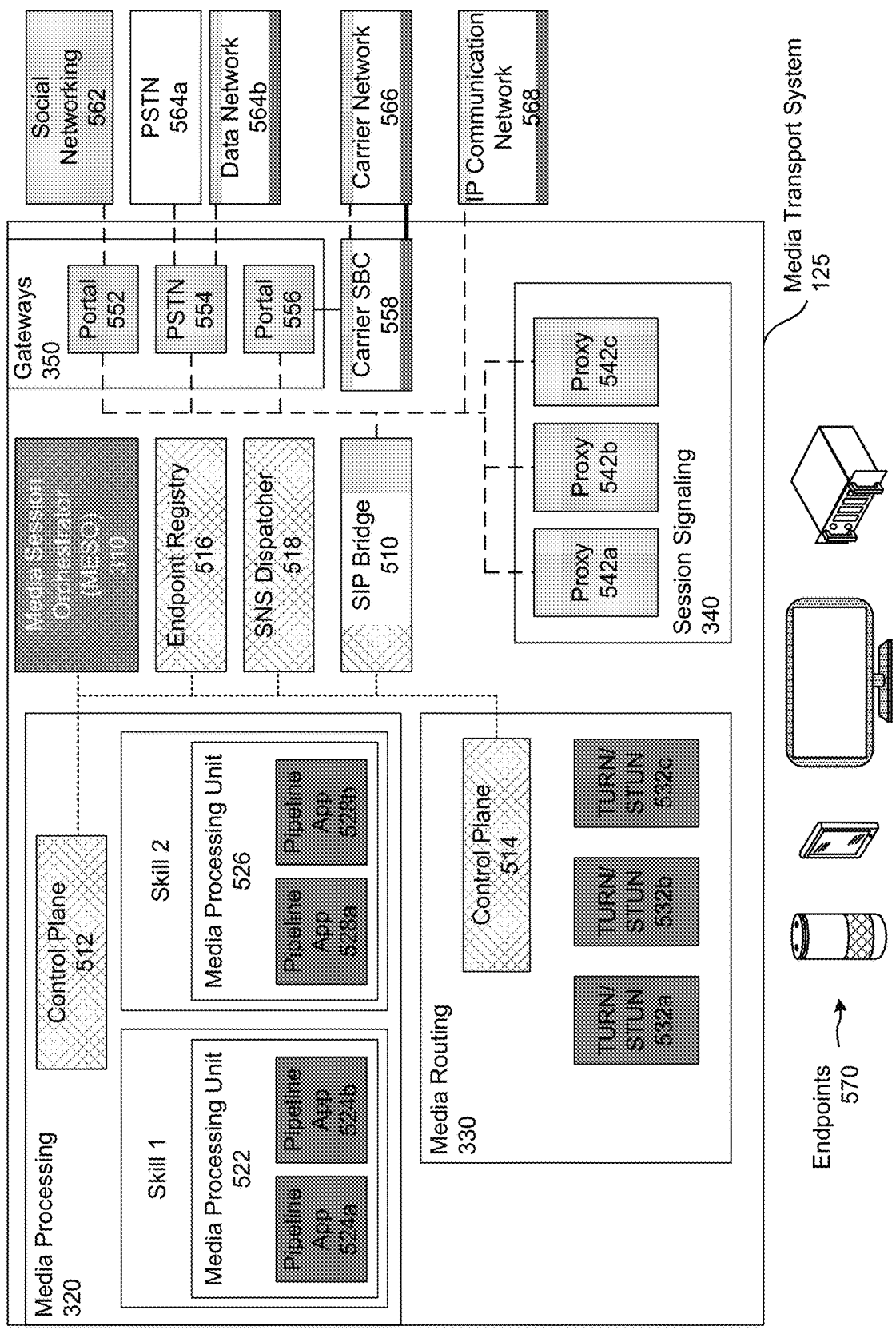
FIG. 5 illustrates an example component diagram of a media transport system configured to perform media processing according to embodiments of the present disclosure.

FIG. 5 illustrates an example component diagram of a media transport system configured to perform media processing according to embodiments of the present disclosure. As illustrated in FIG. 5, a media transport system 125 may include a media session orchestrator (MESO) component 310 configured to coordinate (e.g., define, establish, manage, etc.) a communication session (e.g., media session), as discussed above with regard to FIGS. 3A-3B. For example, the MESO component 310 may interface between components that fall within four distinct categories: media processing components 320, media routing components 330, session signaling components 340, and/or gateway components 350. In addition, FIG. 5 illustrates the MESO component 310 communicating with an endpoint registry 516, a simple notification service (SNS) dispatcher component 518, and/or a SIP bridge component 510.

For ease of illustration, FIG. 5 illustrates the media processing components 320 as including two skills (e.g., Skill 1 and Skill 2), with each skill having a single media processing unit (MPU) that each include two pipeline applications. For example, Skill 1 includes a first MPU 522 that includes a first pipeline application 524a and a second pipeline application 524b, while Skill 2 includes a second MPU 526 that includes a third pipeline application 528a and a fourth pipeline application 528b. However, the disclosure is not limited thereto and the media processing components 320 may include a plurality of skills, an individual skill may include any number of MPUs, and/or an individual MPU may include any number of pipeline applications without departing from the disclosure. For example, the first skill (e.g., Skill 1) may include a single MPU 522 or 3+ MPUs 522 without departing from the disclosure. Additionally or alternatively, the first MPU 522 may include a single pipeline application 524a or 3+ pipeline applications 524 without departing from the disclosure.

The MPUs 522/526 may perform media processing to enable additional functionality using the pipeline applications 524/528, as described in greater detail below with regard to FIGS. 11-12. Thus, the MPU 324 may receive first data and process the first data to generate second data. As part of performing media processing, the MPU 324 may perform speech processing on audio data and/or image data, perform computer vision processing on image data, modify audio data and/or image data, apply visual effects (e.g., overlay or other graphical element(s)) to image data, and/or the like to enable interesting functionality without departing from the disclosure. For example, the MPUs 522/526 may generate subtitles (e.g., text data) corresponding to speech represented in image data, may translate the subtitles to a different language, may perform text-to-speech processing to enable additional functionality (e.g., describing visual cues for someone that is visually impaired, replacing dialog with speech in a different language, etc.), may perform voice recognition to identify voices represented in audio data, may perform facial recognition to detect and/or identify faces represented in image data, may perform object recognition to detect and/or identify objects represented in image data, may add a graphical overlay to image data (e.g., censoring portions of the image data, adding symbols or cartoons to the image data, etc.), may perform other processing to media content (e.g., colorize black and white movies), and/or the like without departing from the disclosure.

As described in greater detail above, the media routing components 330 may include TURN/STUN servers 532 and may be configured to efficiently route data packets within the media transport system 125 and/or to external networks. For example, the media routing components 330 may include a control plane that coordinates between the TURN/STUN servers 532 to select an optimum route to send the data packets. Additionally or alternatively, the routing components 330 may apply machine learning models to further reduce latency by selecting the optimum route using non-geographical parameters (e.g., availability of servers, time of day, previous history, etc.).

As described in greater detail above, the session signaling components 340 (e.g., edge signaling, signaling network, etc.) may be configured to coordinate signal paths and/or a type of data packets sent between the devices 110 and server(s) within the media transport system 125. For example, the session signaling components 340 may enable the endpoints 570 (e.g., devices 110) to coordinate with each other to determine how data packets are sent between the endpoints 570. The session signaling components 340 may support protocols including Session Initiation Protocol (SIP), Real-Time Communication (RTC) protocol (e.g., WebRTC protocol), voice interface system protocol (e.g., Alexa Voice Service (AVS) protocol and/or other voice user interface protocols), Extensible Messaging and Presence Protocol (XMPP), IP Multimedia Core Network Subsystem (IMS), H.323 standard, and/or the like, although the disclosure is not limited thereto.

As illustrated in FIG. 5, the session signaling components 340 may include proxy components 542 (e.g., proxy server(s)), such as a first proxy component 542a, a second proxy component 542b, and a third proxy component 542c. However, the disclosure is not limited thereto and a number of proxy components 542 may vary without departing from the disclosure. The proxy components 542 may interface with the endpoints 570 and enable the endpoints 570 to send requests to the media transport system 125, initiate a communication session, and/or the like without departing from the disclosure.

While FIG. 5 illustrates the endpoint registry 516, the SNS dispatcher component 518, and the SIP bridge component 510 as separate components from the session signaling components 340, the disclosure is not limited thereto. In some examples, the endpoint registry 516, the SNS dispatcher component 518, and/or the SIP bridge component 510 may be associated with and/or included within the session signaling components 340 without departing from the disclosure.

The endpoint registry 516 may include a database of routing information associated with the endpoints 570 (e.g., devices 110). For example, the routing information may include network address(es), telephone number(s), and/or other information that enables the media transport system 125 to communicate with the endpoints 570.

The SNS dispatcher component 518 may correspond to a notification and/or messaging service that enables messaging functionality within the media transport system 125. Thus, the SNS dispatcher may enable a variety of messaging features, allowing the media transport system 125 to send messages to a large number of endpoints. For example, the SNS dispatcher component 518 may allow the mass delivery of messages to a variety of devices on different networks and/or platforms.

The SIP bridge component 510 may be used to translate between the SIP protocol and other signal protocols (e.g., internal command channels) used within the media transport system 125. For example, the SIP bridge component 510 may enable the media transport system 125 to be signaling protocol agnostic. The SIP bridge component 510, along with the gateway components 350, enables components associated with a control plane to communicate with other components that are associated with a signal plane and/or a data plane.

The control plane corresponds to internal command channels that are used to coordinate between components within the media transport system 125. As used herein, components associated with the control plane are represented using crosshatching, and control paths or control signals are represented using dotted lines. For example, the MESO component 310, the control plane component 512, the control plane component 514, the endpoint registry component 516, the SNS dispatcher component 518, and the SIP bridge 510 are represented using crosshatching to indicate that they are associated with the control plane, and control paths between these components are represented using dotted lines.

The signal plane corresponds to signaling between components used to coordinate connections and/or data routing. As used herein, components associated with the signal plane are represented as using light shading (e.g., light gray fill), and signal paths are represented using dashed lines. For example, the SIP bridge component 510, the proxy components 542, the gateway components 350, and external network components are associated with the signal plane and signal paths are represented using dashed lines.

The data plane corresponds to data paths along which data packets are sent between components during a communication session or the like. As used herein, components associated with the data plane are represented using heavy shading (e.g., dark gray fill), and data paths are represented using thick solid lines. For example, the pipeline applications 524/528, the TURN/STUN servers 532, and some of the external network components are associated with the data plane and the data paths used during a communication session are represented using thick solid lines.

Some components may be associated with two or more of the control plane, the signal plane, and the data plane. For example, the SIP bridge component 510 is associated with the control plane and the signal plane, which is indicated by crosshatching on one side and light shading on the other. Additionally or alternatively, external network components may be associated with the signal plane and the data plane, which is indicated by light shading on the top and dark shading on the bottom. For example, the carrier SBC component 558, the carrier network 566, the data network 564b, and the IP communication network 568 are represented using both the signal plane and the data plane. Thus, the media transport system 125 may send data packets to the carrier SBC component 558, the data network 564b, the carrier network 566, and/or the IP communication network 568.

The PSTN 564a is represented without shading or crosshatching, indicating that the PSTN may not be configured to send and receive data packets (e.g., PSTN sends audio signals). However, some PSTN devices may be configured to send and receive data packets via the data network 564b, which is separate from the PSTN itself. Thus, the data network 564b corresponds to individual PSTN devices that have a PSTN telephone number and can be called via the PSTN but may also send and receive data packets using a separate data path via the data network 564b. For ease of explanation, the following drawings will combine the PSTN 564a and the data network 564b into a single component.

As illustrated in FIG. 5, the MESO component 310 is represented as having dark shading and crosshatching, indicating that the MESO component 310 may be associated with the control plane, the signal plane, and/or the data plane without departing from the disclosure. However, the disclosure is not limited thereto and in some examples the MESO component 310 may be only associated with the control plane without departing from the disclosure.

The media transport system 125 (e.g., specifically the session signaling components 340 and/or the SIP bridge component 510) may interface with external networks using gateway components 350. For example, a portal gateway 552 may interface with social networking 562, a PSTN gateway 554 may interface with a PSTN network via data network component 564, a portal gateway 556 may interface with a carrier network 566 via a carrier session border controller (SBC) 558, and/or the like. While FIG. 5 illustrates examples of external networks and/or gateways, the disclosure is not limited thereto and the media transport system 125 may communicate with any external network known to one of skill in the art. Additionally or alternatively, while FIG. 5 illustrates the gateway components 350 as included in the media transport system 125, the disclosure is not limited thereto and the gateway components 350 and/or a portion of the gateway components 350 may be external to the media transport system 125. For example, the external networks may include one or more gateways without departing from the disclosure.

For ease of illustration, FIG. 5 illustrates an Internet Protocol (IP) communication network 568 as an external network. However, the IP communication network 568 may send and receive data packets using the same techniques and/or protocols as the media transport system 125. Thus, the media transport system 125 may directly interface with the IP communication network 568 without using the gateway components 350.

Figure 6:
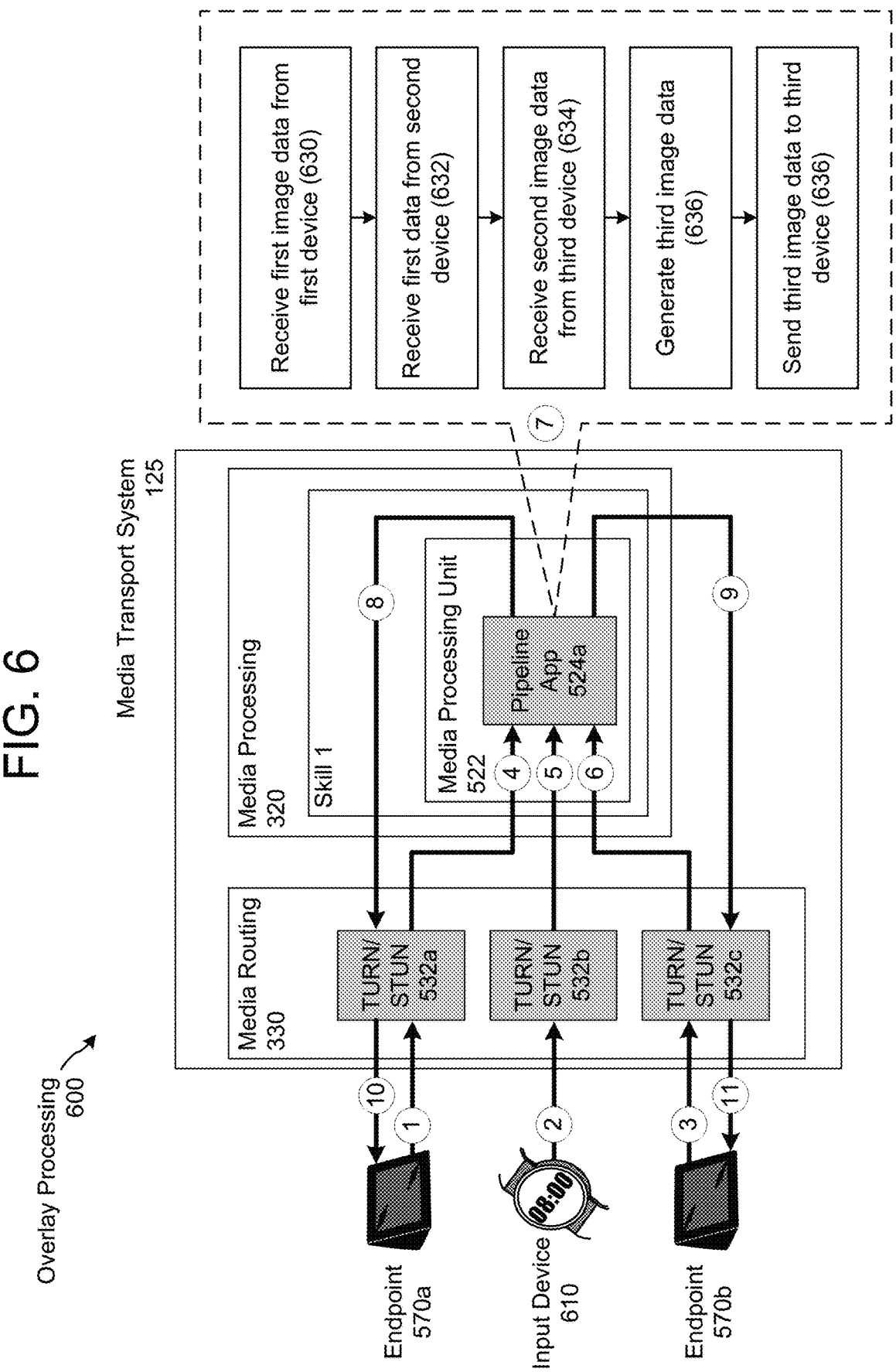
FIG. 6 illustrates an example of a communication session that includes overlay media processing in two directions according to embodiments of the present disclosure.

FIG. 6 illustrates an example of a communication session that includes overlay media processing in two directions according to embodiments of the present disclosure. For example, during overlay processing 600, the media processing components 320 may generate first output image data using at least first input image data received from the first endpoint 570a and generate second output image data using at least second input image data received from the second endpoint 570b. Thus, the media processing components 320 may use first data received from an input device 610 to perform overlay media processing to generate the first output image data and/or the second output image data. However, the disclosure is not limited thereto and in some examples the media processing components 320 may only perform overlay media processing in a single direction without departing from the disclosure. For example, the media processing components 320 may perform overlay media processing using the first input image data received from the first endpoint 570a and the first data received from the input device 610 to generate the first output image data, which may be sent to the second endpoint 570b.

In the example illustrated in FIG. 6, the communication session involves the media processing components 320. Therefore, while not illustrated in FIG. 6, the MESO component 310 may communicate with the control plane component 512, the control plane component 514, and/or other components as part of coordinating the communication session. As part of initiating the communication session, the session signaling components 340 may enable the first endpoint 570a to coordinate with the second endpoint 570b. For example, the first endpoint 570a and the second endpoint 570b may exchange data via proxy component(s) 542 and/or other components included in the media transport system 125.

To initiate the communication session, the first endpoint 570a may generate a request that instructs the media transport system 125 to initiate and/or manage a communication session between the first endpoint 570a and the second endpoint 570b, with the media processing components 320 processing data flowing in one or both directions. While not illustrated in FIG. 6, the first endpoint 570a may send the request to a first proxy component 542a that forwards the request to the SIP bridge 510, although the disclosure is not limited thereto. The SIP bridge 510 may translate the request into an intent and send the request and/or intent to the MESO component 310. In addition, the SIP bridge 510 and/or the MESO component 310 may raise an event through the MTS API 360 to the skill component 290a. The skill component 290a may provide input regarding the communication session, such as what the event will look like and/or other parameters of the communication session to the MESO component 310 via the MTS API 360.

The MESO component 310 may identify a skill and/or media processing unit corresponding to the request (e.g., Skill 1 and MPU component 522) and send a message to the control plane component 512 with a command to start the pipeline application 524a associated with the MPU component 522. While not illustrated in FIG. 6, the control plane component 512 may communicate with the MPU component 522 to prepare for the communication session. Additionally or alternatively, the control plane component 512 may also send information about the pipeline application 524a to the MESO component 310. This information may include codec information, an IP address, and/or other information relevant to enable other participants to connect to the pipeline application 524a as well. The MESO component 310 and/or the control plane component 512 may also send data to an input device 610 and/or a database associated with the input device 610 instructing the input device 610 to provide requested media content indicated by the request (e.g., input data, such as measurement data or other diagnostic information generated by one or more sensors 114).

In the example illustrated in FIG. 6, the second endpoint 570b is associated with the media transport system 125 (e.g., communicates with the media transport system 125 via the media routing components 330 instead of gateway components 350). Thus, the MESO component 310 and/or the SIP bridge 510 may identify routing information associated with the second endpoint 570b using techniques known to one of skill in the art without departing from the disclosure.

While FIG. 6 illustrates an example of a communication session using the media routing components 330, the disclosure is not limited thereto. Instead, the system 100 may establish a communication session using any techniques known to one of skill in the art without departing from the disclosure. For example, the system 100 may communicate with the second endpoint 570b using a telephone number (e.g., via the PSTN 554 and/or a cellular connection) without departing from the disclosure. Additionally or alternatively, the system 100 may establish and terminate a communication session using any connection and/or network known to one of skill in the art without departing from the disclosure. For example, the system 100 may communicate with the second endpoint 570b using an internet protocol (IP) address associated with the second endpoint 570b without departing from the disclosure.

While not illustrated in FIG. 6, the second endpoint 570b may receive the communication session request and notify a second user 5b of the second endpoint 570b of the request. For example, the second endpoint 570b may "ring" by outputting audio and/or displaying a graphical interface indicating the communication session request. In some examples, the second endpoint 570b may send a first notification that the second endpoint 570b is ringing back to the media transport system 125. If the second user 5b decides to accept the communication session request, the second endpoint 570b may send a second notification that the communication session request was accepted (e.g., answered) to the media transport system 125. These notifications may be sent to the media transport system 125 via the SIP bridge component 510, and the SIP bridge component 510 may send an event to the MESO component 310 indicating that the communication session is established. The SIP bridge component 510, either directly or via the MESO component 310, may also send data to the skill component 290a to indicate that the communication session request was accepted.

In some examples, the input device 610 may be included in the communication session based on the initial communication session request from the first endpoint 570a. For example, the first endpoint 570a may be communicatively coupled to the input device 610 and/or configured to perform communication sessions using input data received from the input device 610. However, the disclosure is not limited thereto, and in other examples the media transport system 125 may initialize the communication session based on the communication session request and then the first endpoint 570a may send a request to the media transport system 125 instructing the media transport system 125 to include input data generated by the input device 610. In some examples the media transport system 125 may add the input device 610 as a participant in the communication session, although the disclosure is not limited thereto and the media transport system 125 may associate the input data generated by the input device 610 with the communication session without adding the input device 610 as a participant.

If the communication session is initialized prior to the input device 610 being included in the communication session, the media transport system 125 may initialize the communication session without using the pipeline application 524a. For example, the media transport system 125 may send image data between the first endpoint 570a and the second endpoint 570b using the media routing components 330 but without using the media processing components 320. Thus, after the media transport system 125 receives the request to add the input device 610 to the communication session, the media transport system 125 may reconfigure the communication session and route the image data between the first endpoint 570a and the second endpoint 570b via the media processing components 320.

To coordinate data routing, the MESO component 310 may send a command to the control plane component 514 to request that the media routing components 330 route data packets during the communication session. For example, the MESO component 310 may request that a first TURN/STUN server 532a route data between the first endpoint 570a and the pipeline application 524a, that a second TURN/STUN server 532b route data between the input device 610 and the pipeline application 524a, and/or that a third TURN/STUN server 532c route data between the second endpoint 570b and the pipeline application 524a. In some examples, the MESO component 310 may send detailed routing information that identifies how the media routing components 330 should route the data during the communication session. However, the disclosure is not limited thereto and the MESO component 310 may send a command that identifies the routing information (e.g., IP addresses and/or the like) associated with the first endpoint 570a, the input device 610, the second endpoint 570b, and/or the pipeline application 524a and the media routing components 330 may determine how to route the data independently.

In some examples, the first endpoint 570a may send the communication session request directly to the media transport system 125. However, the disclosure is not limited thereto and in other examples, the skill component 290a may send the communication session request to the media transport system 125 via the MTS API 360. The MTS API 360 may receive the request from the skill component 290a and may send the request to the MESO component 310. In response to receiving the request, the MESO component 310 may initiate and manage the communication session between the first endpoint 570a and the second endpoint 570b.

After the communication session is configured to include the media processing components 320, the first endpoint 570a and the second endpoint 570b may send and receive data using a media pipeline routed through the media processing components 320 and the media routing components 330. For example, FIG. 6 illustrates an example of the first endpoint 570a sending first input image data to the first TURN/STUN server 532a associated with the first endpoint 570a (step "1"), the input device 610 sending first data to the second TURN/STUN server 532b associated with the input device 610 (step "2"), and the second endpoint 570b sending second input image data to the third TURN/STUN server 532c associated with the second endpoint 570b (step "3"). As illustrated in FIG. 6, the first TURN/STUN server 532a may send the first input image data to the pipeline application 524a in the media processing unit 522 (step "4"), the second TURN/STUN server 532b may send the first data to the pipeline application 524a in the media processing unit 522 (step "5"), and the third TURN/STUN server 532c may send the second input image data to the pipeline application 524a in the media processing unit 522 (step "6").

Using the first input image data, the first data, and/or the second input image data, the pipeline application 524a may generate first output image data (e.g., directed to the second endpoint 570b) and/or second output image data (e.g., directed to the first endpoint 570a) (step "7"). For example, the pipeline app 524a may receive (630) first image data from the first device (e.g., first input image data from the first endpoint 570a), may receive (632) first data from the second device (e.g., input data from the input device 610), may receive (634) second image data from the third device (e.g., second input image data from the second endpoint 570b), may generate (636) third image data (e.g., first output image data directed to the second endpoint 570b), and may send (638) the third image data to the third device (e.g., send the first output image data to the second endpoint 570b). While not illustrated in FIG. 6, the pipeline app 524a may also generate fourth image data (e.g., second output image data directed to the first endpoint 570a) and may send the fourth image data to the first device (e.g., send the second output image data to the first endpoint 570a).

To illustrate an example, the first input image data received from the first endpoint 570a may represent a first image corresponding to a first user 5a. Similarly, the second input image data received from the second endpoint 570b may represent a second image corresponding to a second user 5b. In this example, the first endpoint 570a is associated with the input device 610, such that the second endpoint 570b may receive the first output image data representing the first image along with an overlay representing the first data. Thus, the first data received from the input device 610 (e.g., input data) may represent information about the first user 5a, such as measurement data generated by one or more sensors 114 included in and/or associated with the input device 610.

While FIG. 6 illustrates the input device 610 as a wearable device (e.g., smart watch, which may monitor a heart rate and/or other vital signs), the disclosure is not limited thereto and the input device 610 may vary without departing from the disclosure. Thus, the input device 610 may correspond to any device 112 that includes one or more sensors 114 configured of generate measurement data and/or the like. Additionally or alternatively, while FIG. 6 illustrates the input device 610 as a single device, the disclosure is not limited thereto and the input device 610 may comprise multiple devices without departing from the disclosure.

In some examples, the first output image data may represent the first image in a first area (e.g., first rectangle corresponding to a resolution of the first output image data), the second image in a first portion of the first area (e.g., smaller second rectangle in a corner of the first area), and the first data in second portion(s) of the first area (e.g., as an overlay on top of the first image in one or more locations within the first rectangle). Similarly, the second output image data may represent the second image in a second area (e.g., first rectangle corresponding to a resolution of the second output image data), the first image in a first portion of the second area (e.g., smaller second rectangle in a corner of the second area), and the first data in second portion(s) of the second area (e.g., as an overlay on top of the second image in one or more locations within the first rectangle).

Thus, the second endpoint 570b may display to the second user 5b the first output image data, which represents the first image (e.g., representation of the first user 5a), an overlay of the first data on top of the first image, and a floating window (e.g., picture-in-picture window) corresponding to the second image (e.g., representation of the second user 5b). Similarly, the first endpoint 570a may display to the first user 5a the second output image data, which represents the second image (e.g., representation of the second user 5b), an overlay of the first data on top of the second image, and a floating window (e.g., picture-in-picture window) corresponding to the first image (e.g., representation of the first user 5a). However, the disclosure is not limited thereto, and in some examples the second output image data may represent the first data along with the first image (e.g., as an overlay on top of the first image in the second rectangle), may not represent the first data at all (e.g., the first data is not visible to the first user 5a), and/or the like without departing from the disclosure.

After generating the first output image data and/or the second output image data, the pipeline application 524a may send the second output image data to the first TURN/STUN server 532a associated with the first endpoint 570a (step "8") and may send the first output image data to the third TURN/STUN server 532c associated with the second endpoint 570b (step "9"). The first TURN/STUN server 532a may send the second output image data to the first endpoint 570a (step "10") and the third TURN/STUN server 532c may send the first output image data to the second endpoint 570b (step "11"). Thus, the TURN/STUN servers 532 may route image data (e.g., input image data and output image data) and/or the input data between the endpoints 570, the input device 610, and/or the pipeline app 524a. However, the disclosure is not limited thereto, and the media transport system 125 may route the image data and/or the input data using any techniques known to one of skill in the art without departing from the disclosure.

While the example described above and illustrated in FIG. 6 refers to the communication session including media processing in both directions (e.g., two-way audio or video chat), the disclosure is not limited thereto. Instead, the media transport system 125 may perform media processing in only one direction, such that the second endpoint 570b may receive the first output image data without the first endpoint 570a receiving the second output image data, or vice versa, without departing from the disclosure. For example, the media transport system 125 may generate the first output image data using the first input image data received from the first endpoint 570a and the first data received from the input device 610 and may send the first output image data to the second endpoint 570b without sending any image data to the first endpoint 570a. A single-direction communication session between endpoints 570 (e.g., one-way calling) may occur between a first user 5a and a second user 5b, between a first device 110a and a second device 110b that are both associated with the first user 5a (e.g., security camera or remote monitoring implementation), and/or the like.

While FIG. 6 illustrates the media transport system 125 routing data directly between the media processing components 320 and the endpoints 570/input device 610 using the media routing components 330 (e.g., using TURN/STUN servers 532), the disclosure is not limited thereto. Instead, the media transport system 125 may route data using any techniques known to one of skill in the art without departing from the disclosure. For example, the media transport system 125 may use the gateway components 350 and/or other components to route the data without departing from the disclosure.

FIGS. 7A-7E illustrate examples of input device configurations according to embodiments of the present disclosure. As will be described in greater detail below, the input device 610 may send the first data (e.g., input data) to the media processing components 320 using a direct access configuration 710, a side-channel configuration 720, an indirect access configuration 730, an internal database configuration 740, and/or an external database configuration 760, although the disclosure is not limited thereto.

As illustrated in FIG. 7A, the input device 610 may send the first data to the media processing components 320 using the direct access configuration 710. For example, the input device 610 may independently send the first data to the pipeline app 524a via the media routing components 330. As illustrated in FIG. 7A, the first endpoint 570a may send the first input image data to the first TURN/STUN server 532a (step "1"), the input device 610 may send the first data to the second TURN/STUN server 532b (step "2"), the first TURN/STUN server 532a may send the first input image data to the pipeline app 524a (step "3"), and the second TURN/STUN server 532b may send the first data to the pipeline app 524a (step "4").

As illustrated in FIG. 7B, the input device 610 may send the first data to the media processing components 320 using the side-channel configuration 720. For example, the input device 610 may be linked to the first endpoint 570a and the first endpoint 570a may send the first data to the pipeline app 524a via the media routing components 330. As illustrated in FIG. 7B, the input device 610 may send the first data to the first endpoint 570a (step "1"), the first endpoint 570a may send the first input image data and the first data (e.g., separate channels of data) to the first TURN/STUN server 532a (step "2"), and the first TURN/STUN server 532a may send the first input image data and the first data to the pipeline app 524a (step "3").

As illustrated in FIG. 7C, the input device 610 may send the first data to the media processing components 320 using the indirect access configuration 730. For example, the input device 610 may be linked to a third endpoint 570c (e.g., smartphone, although the disclosure is not limited thereto) and the third endpoint 570c may send the first data to the pipeline app 524a via the media routing components 330. As illustrated in FIG. 7C,"), the first endpoint 570a may send the first input image data to the first TURN/STUN server 532a (step "1"), the input device 610 may send the first data to the third endpoint 570c (step "2"), the third endpoint 570c may send the first data to the second TURN/STUN server 532b (step "3"), the first TURN/STUN server 532a may send the first input image data to the pipeline app 524a (step "4"), and the second TURN/STUN server 532b may send the first data to the pipeline app 524a (step "5").

As illustrated in FIG. 7D, the input device 610 may send the first data to the media processing components 320 using the internal database configuration 740. For example, the input device 610 may store measurement data in database storage 750 that is internal to the media transport system 125 and the database storage 750 may send a portion of the measurement data to the pipeline app 524a. As illustrated in FIG. 7D, the input device 610 may send the first data to the second TURN/STUN server 532b (step "1") and the second TURN/STUN server 532b may send the first data to the database storage 750 (step "2"). For example, prior to the communication session, the input device 610 may periodically send measurement data to the database storage 750 and the database storage 750 may associate the measurement data with the first user profile and/or the input device 610.

During the communication session, the first endpoint 570a may send the first input image data to the first TURN/STUN server 532a (step "3"), the first TURN/STUN server 532a may send the first input image data to the pipeline app 524a (step "4"), and the database storage 750 may send the first data to the pipeline app 524a (step "5"). While not illustrated in FIG. 7D, in some examples the media transport system 125 may send a request to the database storage 750 indicating a time range of measurement data associated with the first user profile. Thus, the database storage 750 may send the first data in response to the request from the media transport system 125, although the disclosure is not limited thereto.

While not illustrated in FIG. 7D, in some examples the database storage 750 may send the first data to the pipeline application 524a via a TURN/STUN server 532. For example, the database storage 750 may not be on the media transport system 125 and/or may not share a network with the media processing unit 522.

As illustrated in FIG. 7E, the input device 610 may send the first data to the media processing components 320 using the external database configuration 760. For example, the input device 610 may store measurement data in database storage 770 that is external to the media transport system 125 (e.g., third party database) and the database storage 770 may send a portion of the measurement data to the pipeline app 524a via the media routing components 330. As illustrated in FIG. 7E, the input device 610 may send the first data directly to the database storage 770 (step "1") and the database storage 770 may store the first data. For example, prior to the communication session, the input device 610 may periodically send measurement data to the database storage 770 and the database storage 770 may associate the measurement data with the first user profile and/or the input device 610.

During the communication session, the first endpoint 570a may send the first input image data to the first TURN/STUN server 532a (step "2"), the database storage 770 may send the first data to the second TURN/STUN server 532b (step "3"), the first TURN/STUN server 532a may send the first input image data to the pipeline app 524a (step "4"), and the second TURN/STUN server 532b may send the first data to the pipeline pap 524a (step "5"). While not illustrated in FIG. 7E, in some examples the media transport system 125 may send a request to the database storage 770 indicating a time range of measurement data associated with the first user profile. Thus, the database storage 770 may send the first data in response to the request from the media transport system 125, although the disclosure is not limited thereto.

In the examples illustrated in FIGS. 7D-7E, the first data is stored in the database storage 750/770 and the media transport system 125 retrieves the first data from the database storage 750/770. For example, the database storage 750/770 may correspond to a database that is external to the media transport system 125, a database that is included within the media transport system 125, a database associated with the first endpoint 570a, and/or a database associated with the input device 610 without departing from the disclosure.

The MESO component 310 and/or the control plane component 512 may send a request to the database storage 750/770 instructing the database storage 750/770 to provide requested measurement data indicated by the request (e.g., first data) during the communication session.

While FIGS. 7A-7E illustrate examples of the endpoint 570 being connected to an external network and interfacing with the media transport system 125 via the media routing components 330, this is for ease of illustration only and the disclosure is not limited thereto. Instead, the endpoint(s) 570 may be connected to the TURN/STUN servers 532 via the data network component 564 without departing from the disclosure. Additionally or alternatively, the endpoint 570 may be connected to the media transport system 125 using the gateway components 350 and/or using any techniques known to one of skill in the art without departing from the disclosure.

While FIGS. 7A-7E illustrate examples of the endpoints 570a/570b and/or the input device 610 routing data via the TURN/STUN servers 532, the disclosure is not limited thereto and the endpoints 570a/570b and/or the input device 610 may send/receive data directly to/from the media processing components 320 without using the TURN/STUN servers 532 without departing from the disclosure. For example, one or more of the first endpoint 570a, the second endpoint 570b, and/or the input device 610 may send data directly to the media processing components 320 without departing from the disclosure.

In the examples illustrated in FIGS. 7A-7E, the media transport system 125 routes the communication session with the first endpoint 570a and the second endpoint 570b through the media processing unit 522 to apply media processing during the communication session. This enables the media transport system 125 to generate a graphical representation of the input data received from the input device 610 during the communication session.

In some examples, the media transport system 125 may route every communication session through the media processing components 320. For example, the media transport system 125 may route data through the media processing components 320 during a communication session with the first endpoint 570a and the second endpoint 570b even when the input device 610 is not present and the media transport system 125 does not generate a graphical representation of the input data. Thus, when the input device 610 is added to the communication session, the media transport system 125 may route the additional input data received from the input device 610 to the media processing unit 522 and perform additional media processing without any other changes to routing data and/or how data is routed between the first endpoint 570a and the second endpoint 570b.

While routing every communication session through the media processing components 320 enables additional functionality and/or effects, it also increases a cost, processing consumption, in-call latency, risks to privacy concerns (e.g., user privacy), and/or the like. Therefore, the disclosure is not limited thereto and in other examples, the media transport system 125 may route a communication session between the first endpoint 570a and the second endpoint 570b without the media processing unit 522 and/or any media processing components 320. For example, the media transport system 125 may route data directly from the first TURN/STUN server 532a to the second TURN/STUN server 532b without departing from the disclosure. Additionally or alternatively, depending on a network configuration and user preferences, the first endpoint 570a may send/receive data directly from the second TURN/STUN server 532b, the second endpoint 570b may send/receive data directly from the first TURN/STUN server 532a, and/or the first endpoint 570a and the second endpoint 570b may send/receive data directly from each other without using the media routing components 330. For example, the first endpoint 570a may send data to the second endpoint 570b via the second TURN/STUN server 532b and the second endpoint 570b may send data to the first endpoint 570a via the first TURN/STUN server 532a without departing from the disclosure.

In some examples, the media transport system 125 may use the media processing components 320 on demand, such that the media transport system 125 routes data directly (e.g., without going through the media processing components 320) during a communication session with the first endpoint 570a and the second endpoint 570b until additional functionality is requested. For example, a communication session may be started without routing data through the media processing components 320 (e.g., using a peer-to-peer connection with end-to-end encryption, although the disclosure is not limited thereto), and when a participant and/or device associated with the communication session requests additional functionality, the media transport system 125 may update the communication session with new routing data such that data is routed through the media processing unit 522 during the communication session.

In some examples, the media transport system 125 may modify the communication session to route data through the media processing components 320 based on a feature being enabled that requires advanced processing and/or other triggers. For example, the media transport system 125 may modify the communication session when a third participant is added to a two-party call (e.g., the media transport system 125 receives a request to add another device, such as a third device 110c and/or the input device 610, to the communication session), when an advanced filter or other functionality is enabled during the communication session (e.g., the media transport system 125 receives a request to perform media processing and/or other additional functionality), and/or the like. Thus, the media transport system 125 may modify an existing communication session to route data to the media processing components 320 when the media transport system 125 receives a request to include a graphical representation of the input data received from the input device 610, although the disclosure is not limited thereto.

Similarly, in some examples the media transport system 125 may modify the communication session to stop routing data through the media processing components 320 based on a feature that requires advanced processing being disabled and/or other triggers. For example, the media transport system 125 may modify the communication session when one or more participants leave the communication session, resulting in a two-party call (e.g., the media transport system 125 receives a request to remove the third device 110c, the input device 610, and/or other devices, so that the communication session only includes two devices 110a/110b), when an advanced filter or other functionality is disabled during the communication session (e.g., the media transport system 125 receives a request to end media processing and/or other additional functionality), when the media transport system 125 receives a command to end advanced processing during the communication session (e.g., user 5 revokes permission for advanced processing), and/or the like. Thus, the media transport system 125 may modify an existing communication session to route data directly between the first endpoint 570a and the second endpoint 570b (e.g., without routing data to the media processing components 320) when the media transport system 125 receives a request that instructs the media transport system 125 to stop generating output image data including a graphical representation of the input data received from the input device 610, although the disclosure is not limited thereto.

Additionally or alternatively, in some examples the media transport system 125 may modify the communication session to stop routing data through the media processing components 320 when the media transport system 125 determines that a user experience is affected due to network conditions (e.g., low bandwidth, packet loss, jitter, etc.). For example, the media transport system 125 may determine that the user experience is negatively affected when the communication session is routed through the media processing components 320 but that an alternative routing path (e.g., peer-to-peer) is available that may improve the user experience. However, the disclosure is not limited thereto and another device may determine to modify the communication session and the media transport system 125 may receive a command from the device to modify the communication session without departing from the disclosure. For example, the first endpoint 570a and/or the second endpoint 570b may send the command to the media transport system 125 requesting that the media transport system 125 stop routing data through the media processing components 320 without departing from the disclosure.

FIG. 8 illustrates an example of output image data according to embodiments of the present disclosure. As described above, the media transport system 125 may receive first data from the input device 610, first input image data 810 (representing a first image) from the first endpoint 570a, and second input image data 820 (representing a second image) from the second endpoint 570b. Thus, the media transport system 125 may generate overlay data 830 representing the first data and may generate output image data 840 that includes the first input image data 810, the second input image data 820, and the overlay data 830.

As illustrated in FIG. 8, the output image data 840 may include a representation of the first image (e.g., first user 5a) in a first area corresponding to a resolution of the output image data 840 (e.g., first rectangle), a representation of the second image (e.g., second user 5b) in a portion of the first area (e.g., second rectangle in a bottom-right corner of the first rectangle), and a representation of the overlay data 830 overlaid on top of the first image in portions of the first area. For example, the overlay data 830 may comprise first overlay data 830a (e.g., first sensor data, illustrated as height, weight, and body temperature information), second overlay data 830b (e.g., information about the first user profile, illustrated as a name and age), and third overlay data 830c (e.g., second sensor data, illustrated as blood pressure [systolic pressure and diastolic pressure], heart rate, and oxygen level information). While not illustrated in FIG. 8, the overlay data 830 may include other input data such as electrocardiogram (e.g., EKG or ECG) data without departing from the disclosure.

While FIG. 8 illustrates examples of the overlay data 830, the disclosure is not limited thereto and the overlay data 830 may include additional measurement data, sensor data, and/or other information associated with the first user profile without departing from the disclosure. Additionally or alternatively, while FIG. 8 illustrates the output image data 840 including the overlay data 830a-830c, the disclosure is not limited thereto and the output image data 840 may include portions of the overlay data 830 without departing from the disclosure. For example, the output image data 840 may only include one of the first overlay data 830a or the third overlay data 830c, may include a portion of the first overlay data 830a (e.g., some of the weight, height, and temperature information), may include a portion of the third overlay data 830c (e.g., some of the blood pressure, heart rate, and oxygen level information), and/or the like without departing from the disclosure.

In some examples, the amount of information represented in the output image data 840 may vary based on the input device 610, the type of sensor(s) 114 available, user preferences, input commands (e.g., input from the first user 5a and/or the second user 5b), a selected time range and/or selected types of information generated by the remote system 120 (e.g., in response to audio data corresponding to the communication session), and/or the like without departing from the disclosure.

While FIG. 8 illustrates an example of a communication session associated with a remote doctor visit (e.g., the input device 610 corresponds to a connected health device that includes sensor(s) 114 configured to generate diagnostic information about a patient, enabling a doctor to diagnose an ailment remotely), the disclosure is not limited thereto. Instead, the overlay data 830 may correspond to any type of measurement data, sensor data, and/or the like generated by the input device 610 without departing from the disclosure. Additionally or alternatively, the overlay data 830 may correspond to other types of information that are not generated by the sensors 114. For example, the input device 610 may correspond to a smartphone and the overlay data 830 may correspond to first data received from the smartphone, such as a grocery list or other information.

Figure 9A:
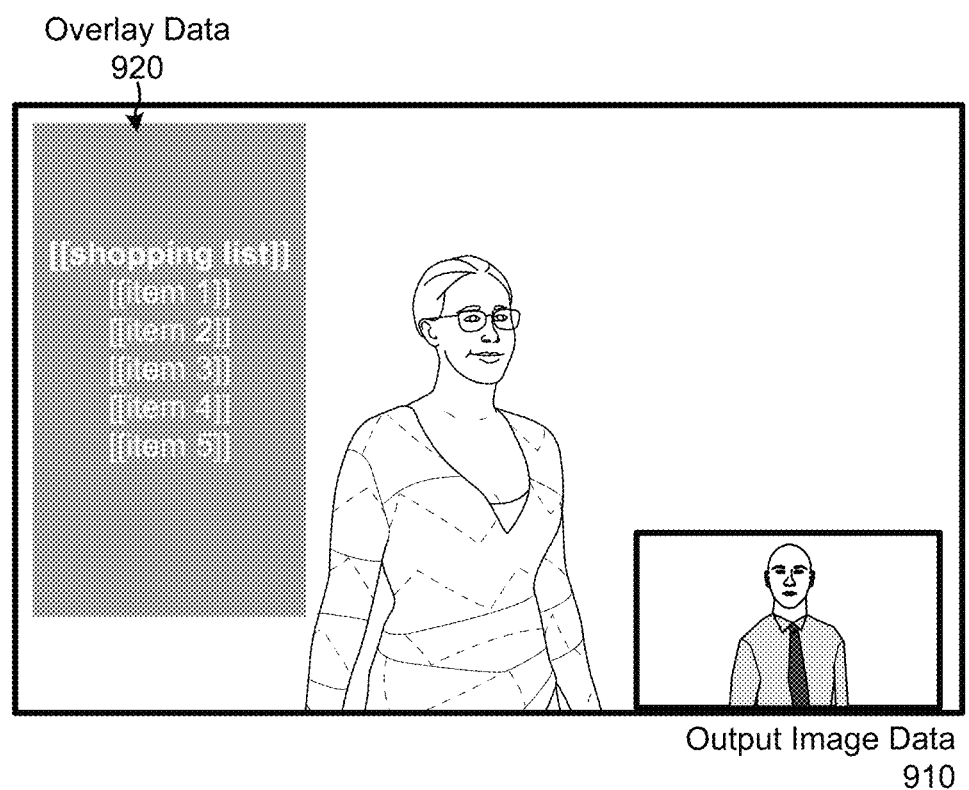
Figure 9B:
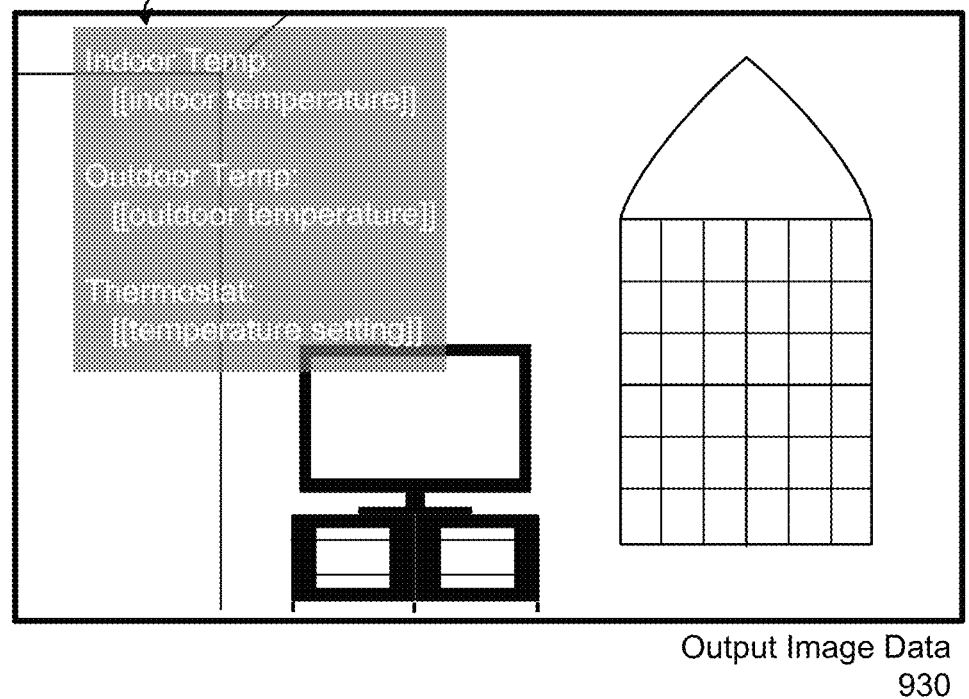

FIGS. 9A-9B illustrate examples of additional output image data according to embodiments of the present disclosure. As illustrated in FIG. 9A, the media transport system 125 may generate output image data 910 that includes overlay data 920 corresponding to a shopping list. Thus, the first endpoint 570a may generate first input image data representing a first image of the first user 5a, the second endpoint 570b may generate second input image data representing a second image of the second user 5b, and the input device 610 may send first data representing the shopping list.

As illustrated in FIG. 9A, the output image data 910 may include a representation of the first image (e.g., first user 5a) in a first area corresponding to a resolution of the output image data 910 (e.g., first rectangle), a representation of the second image (e.g., second user 5b) in a portion of the first area (e.g., second rectangle in a bottom-right corner of the first rectangle), and a representation of the overlay data 920 overlaid on top of the first image in a portion of the first area. While FIG. 9A illustrates that the overlay data 920 represents a shopping list (e.g., [[item 1]], [[item 2]], [[item 3]], [[item 4]], and [[item 5]]), the disclosure is not limited thereto and the overlay data 920 may correspond to any information without departing from the disclosure.

As illustrated in FIG. 9B, the media transport system 125 may generate output image data 930 that includes overlay data 940 corresponding to sensor data associated with a remote location. For example, the first endpoint 570a may generate first input image data representing a first image of the remote location (e.g., security camera, doorbell camera, etc.) and the input device 610 may send first data representing sensor data generated at the remote location. While this example corresponds to single-direction processing, such that the second endpoint 570b does not generate second input image data, the disclosure is not limited thereto and the second endpoint 570b may generate second input image data without departing from the disclosure.

As illustrated in FIG. 9B, the output image data 930 may include a representation of the first image (e.g., remote location) in a first area corresponding to a resolution of the output image data 930 (e.g., first rectangle) and a representation of the overlay data 940 overlaid on top of the first image in a portion of the first area. While FIG. 9B illustrates that the overlay data 940 represents sensor data associated with the remote location (e.g., indoor temperature, outdoor temperature, thermostat settings, etc.), the disclosure is not limited thereto and the overlay data 940 may correspond to any information associated with the remote location without departing from the disclosure.

In some examples, the media transport system 125 may generate output image data without receiving input image data from the first device 110a. Thus, the output image data may include a graphical representation of the input data (e.g., overlay data) even when the first device 110a only sends audio data during the communication session. To illustrate an example, the media transport system 125 may present the input data on top of fixed image data and/or may generate output image data without receiving image data from the devices 110. For example, if the communication session only includes audio data coming from the first device 110a, the media transport system 125 may present the input data on top of image data that corresponds to the first device 110a (e.g., image indicating the first device 110a), image data that corresponds to a first user profile associated with the first device 110a (e.g., image representing the first user profile), generic image data (e.g., image used whenever image data is not received from the first device 110a, which may be identical for multiple devices, user profiles, etc.), blank image data (e.g., blank image, such as a monotone image on which the input data is displayed), and/or the like without departing from the disclosure.

FIG. 9C illustrates examples of the media transport system 125 generating output image data without receiving input image data from the first device 110a. As illustrated in FIG. 9C, the media transport system 125 may generate output image data 950 that includes first image data 955, overlay data 960, and second image data 965. Additionally or alternatively, the media transport system 125 may generate output image data 970 that includes first image data 975 and overlay data 980.

In the examples illustrated in FIG. 9C, the first image data 955/975 may represent a first image corresponding to the first device 110a, a second image corresponding to the first user profile, a third image corresponding to a generic interface used for multiple devices/user profiles, a monotone image, and/or the like without departing from the disclosure. Thus, while FIG. 9C illustrates the first image data 955/975 as a monotone image (e.g., black image), the disclosure is not limited thereto.

The overlay data 960/980 may correspond to a graphical representation of input data, such as sensor data associated with the first device 110a. For example, the input device 610 may send first data representing sensor data, as described above with regard to FIGS. 8-9B.

The second image data 965 may represent a second image corresponding to the second device 110b. For example, the output image data 950 illustrates an example in which the second image data 965 includes a representation of a second user 5b using the second device 110b. However, the disclosure is not limited thereto, and in some examples the media transport system 125 may generate the output image data 970 that doesn't include a representation of the second image data. Additionally or alternatively, the second image data 965 may represent a first image corresponding to the second device 110b, a second image corresponding to a second user profile associated with the second user 5b, a third image corresponding to a generic interface used for multiple devices/user profiles, a monotone image, and/or the like without departing from the disclosure. Thus, while FIG. 9C illustrates the second image data 965 as representing image data corresponding to a video, the disclosure is not limited thereto. In some examples, the communication session may only include first audio data received from the first device 110a and second audio data received from the second device 110b without departing from the disclosure.

While FIGS. 9A-9C illustrate examples of the media transport system 125 generating first output image data to send to the second device 110b, the disclosure is not limited thereto and the media transport system 125 may perform similar processing to generate second output image data to send to the first device 110a. For example, the media transport system 125 may generate the second output image data using the second image data 965 received from the second device 110b (e.g., representation of the second user 5b) in a first area corresponding to a resolution of the output image data 950 (e.g., first rectangle), the first image data 955 (e.g., representation of the first user 5a) in a portion of the first area (e.g., second rectangle in a bottom-right corner of the first rectangle), and a representation of the overlay data 960 overlaid on top of the second image data in a portion of the first area. However, the disclosure is not limited thereto, and the media transport system 125 may generate the second output image data without including a representation of the overlay data 960 without departing from the disclosure. Thus, the overlay data 960 may be visible to the second user 5b and/or both the first user 5a and the second user 5b without departing from the disclosure.

Figure 10:
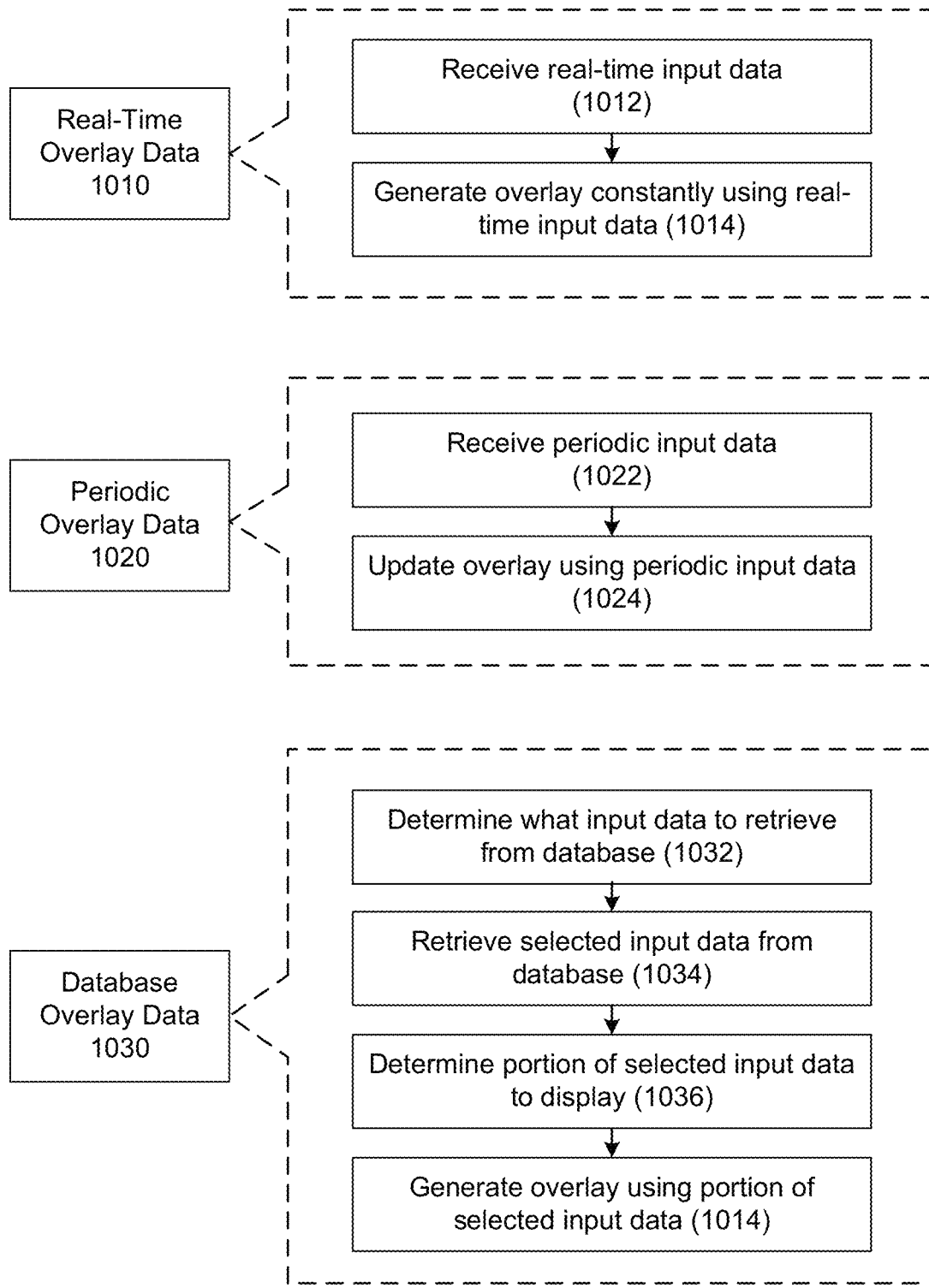
FIG. 10 illustrates examples of overlay data according to embodiments of the present disclosure.

FIG. 10 illustrates examples of overlay data according to embodiments of the present disclosure. As illustrated in FIG. 10, overlay data can correspond to real-time overlay data 1010 (e.g., constantly updated information), periodic overlay data 1020 (e.g., static information that is updated as new information is received), and/or database overlay data 1030 (e.g., a portion of data stored in a database that is selected during the communication session), although the disclosure is not limited thereto.

To illustrate an example of real-time overlay data 1010, FIG. 10 illustrates that the media transport system 125 may receive (1012) real-time input data and may generate (1014) an updated overlay constantly using the real-time input data. For example, the input device 610 may constantly monitor first measurement data (e.g., temperature, heart rate, etc.) of the first user 5a during the communication session and the media transport system 125 may display current values of the first measurement data.

To illustrate an example of periodic overlay data 1020, FIG. 10 illustrates that the media transport system 125 may receive (1022) periodic input data and may update (1024) an overlay using the periodic input data. For example, the input device 610 may periodically generate second measurement data (e.g., weight, blood pressure, oxygen levels, etc.) of the first user 5a during the communication session and the media transport system 125 may display most recent values of the second measurement data until updated values are received.

To illustrate an example of database overlay data 1030, FIG. 10 illustrates that the media transport system 125 may determine (1032) what input data to retrieve from a database during the communication session, may retrieve (1034)

selected input data from the database, may determine (1036) a portion of the selected input data to display, and may generate (1038) an overlay using the portion of the selected input data.

In step 1032, the media transport system 125 may determine which type of input data to retrieve and from which database. For example, the media transport system 125 may receive input data from the user(s) 5 (e.g., input on a touchscreen or other input component of the endpoints 570), from the remote system 120 (e.g., a request and/or speech processing data corresponding to audio data during the communication session), and/or the like indicating a type of input data that is relevant to the communication session and/or a specific database in which the input data is stored. To illustrate an example, if the first user 5a describes feeling chest pain recently, the remote system 120 and/or the media transport system 125 may determine that input data associated with heart rate information is relevant to the communication session.

In step 1034, the media transport system 125 may retrieve selected input data from the database based on the determination made in step 1032. For example, the media transport system 125 may retrieve all heart rate information available from the selected database.

In step 1036, the media transport system 125 may determine a portion of the selected input data to display based on input data. For example, if the first user 5a described feeling chest pain at a certain time and date, the media transport system 125 may select a portion of the selected input data corresponding to the specified time and date. Thus, the media transport system 125 may filter out at least some of the selected input data retrieved from the database and only display the most relevant information.

In some examples, the first user 5a and/or the second user 5b may generate input data indicating the portion of the selected input data to display. For example, the users 5a/5b may input a voice command specifying a specific time range, the users 5a/5b may use a separate input device to select the portion of the input data, and/or the like without departing from the disclosure.

Figure 11:
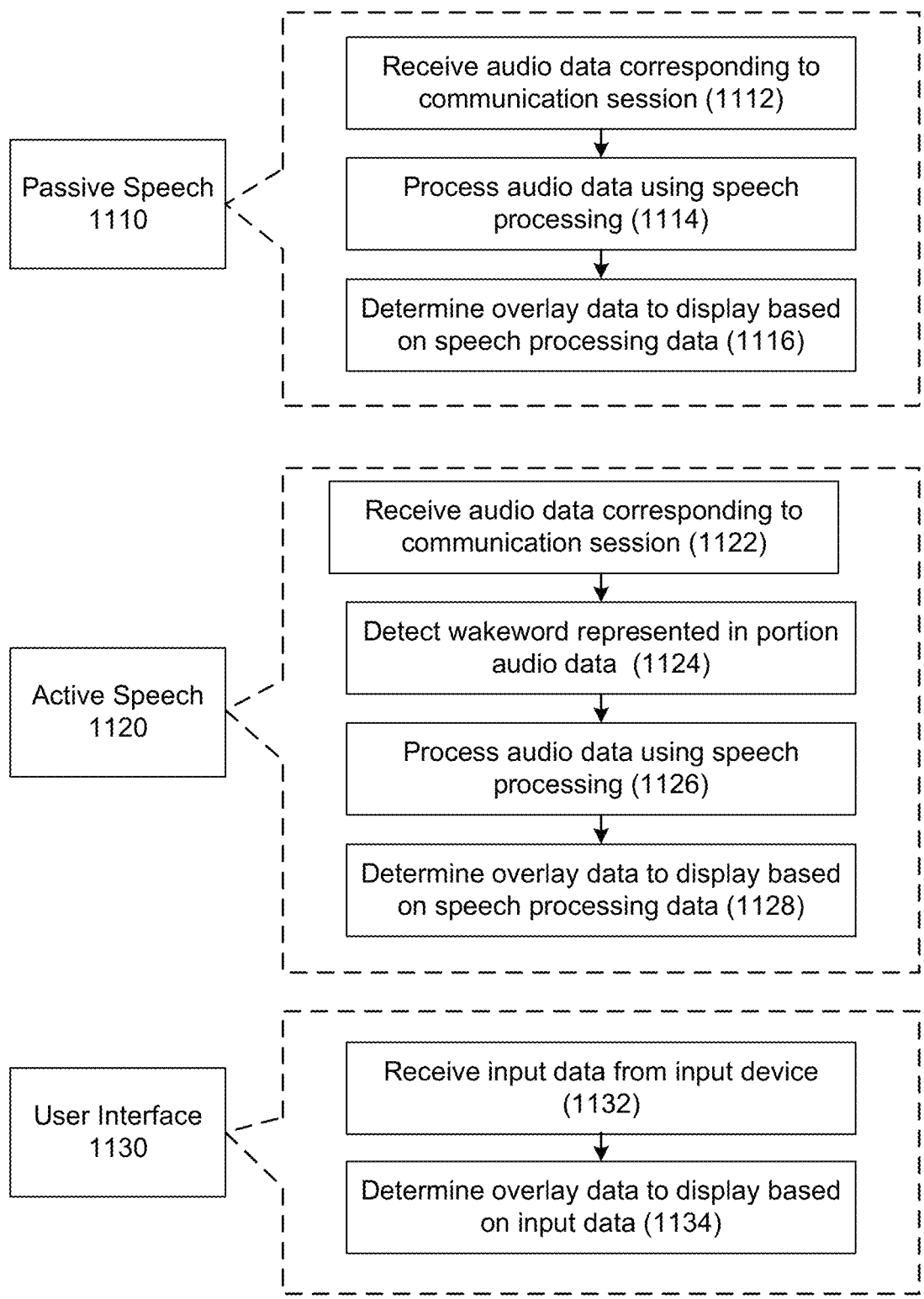
FIG. 11 illustrates examples of input techniques for controlling overlay data according to embodiments of the present disclosure.

FIG. 11 illustrates examples of input techniques for controlling overlay data according to embodiments of the present disclosure. As illustrated in FIG. 11, input techniques may include passive speech 1110 (e.g., the remote system 120 may monitor audio data corresponding to the communication session to display relevant input data), active speech 1120 (e.g., the remote system 120 may receive audio data representing an utterance in response to a wakeword being detected during the communication session), user interface 1130 (e.g., touchscreen, keyboard and mouse, and/or other input components provide input to the media transport system 125), and/or the like.

To illustrate an example of passive speech 1110, FIG. 11 illustrates that the remote system 120 and/or the media transport system 125 may receive (1112) audio data corresponding to a communication session, may process (1114) the audio data using speech processing to generate speech processing data, and may determine (1116) overlay data to display based on the speech processing data. For example, the remote system 120 may monitor all audio data associated with the communication session in order to generate overlay data relevant to the communication session.

To illustrate an example of active speech 1120, FIG. 11 illustrates that the remote system 120 and/or the media transport system 125 may receive (1122) audio data corresponding to a communication session, may detect (1124) a wakeword represented in a portion of the audio data, may process (1126) the portion of the audio data using speech processing to generate speech processing data, and may determine (1128) overlay data to display based on the speech processing data. For example, the remote system 120 may only determine overlay data relevant to the communication session in response to detecting a wakeword in the audio data, enabling the user(s) 5 to input a voice command to control the overlay data.

To illustrate an example of user interface 1130, FIG. 11 illustrates that the remote system 120 and/or the media transport system 125 may receive (1132) input data from an input device (e.g., touchscreen, mouse and keyboard, and/or the like, which is different than the input device 610 described above) and may determine (1134) overlay data to display based on the input data. For example, the media transport system 125 may receive a command from the first endpoint 570a and/or the second endpoint 570b that indicates a portion of the first data to display during the communication session.

Figure 12:
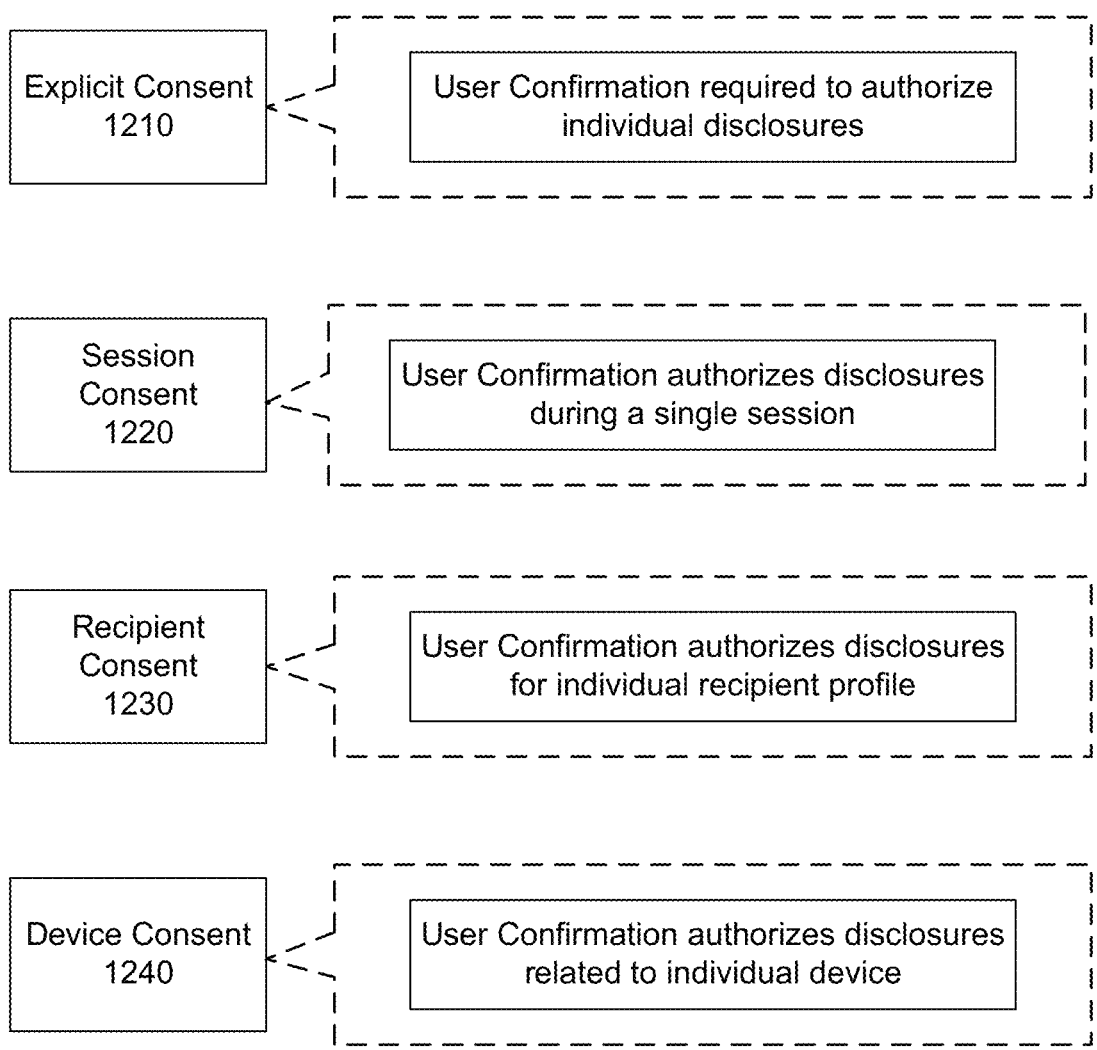
FIG. 12 illustrates examples of user confirmation required to authorize disclosures according to embodiments of the present disclosure.

FIG. 12 illustrates examples of user confirmation required to authorize disclosures according to embodiments of the present disclosure. To protect a privacy of the first user 5a and prevent unauthorized disclosures, the remote system 120 and/or the media transport system 125 may require consent from the first user 5a prior to generating the overlay data during the communication session. Thus, the remote system 120 and/or the media transport system 125 may ensure that the first user 5a wants to share the information represented by the overlay data with the second user 5b.

As illustrated in FIG. 12, the remote system 120 and/or the media transport system 125 may receive consent from the first user 5a based on explicit consent 1210 (e.g., user confirmation required to authorize individual disclosures), session consent 1220 (e.g., user confirmation authorizes disclosures during a single session), recipient consent 1230 (e.g., user confirmation authorizes disclosures for an individual recipient profile), and/or device consent 1240 (e.g., user confirmation authorizes disclosures related to an individual device), although the disclosure is not limited thereto.

To illustrate an example of explicit consent 1210, the media transport system 125 is required to receive explicit authorization from the first user 5a before each disclosure during the communication session. For example, each time the second user 5b requests information from the database, the first user 5a must specifically authorize disclosure of the requested information prior to the media transport system 125 displaying the requested information as an overlay.

In contrast to explicit consent 1210, session consent 1220 enables the first user 5a to authorize all disclosures during an individual communication session. For example, the first user 5a may provide explicit authorization for the duration of the communication session, such that the media transport system 125 may immediately display any information requested by the second user 5b during the communication session without requesting explicit permission from the first user 5a.

Similarly, recipient consent 1230 enables the first user 5a to authorize all disclosures to an individual recipient profile. For example, the first user 5a may provide explicit authorization for the recipient profile to access historical records, such that the media transport system 125 may immediately display any information requested by the second user 5b during any subsequent communication session without requesting explicit permission from the first user 5a.

Finally, device consent 1240 enables the first user 5a to authorize all disclosures associated with a particular device or database. For example, the first user 5a may provide explicit authorization for the second user 5b to access historical records associated with the particular device, such as a smart watch or other wearable device. Thus, the media transport system 125 may immediately display any information associated with the particular device that is requested by the second user 5b during any subsequence communication session without requesting explicit permission from the first user 5a.

While FIG. 12 illustrates multiple examples of obtaining user confirmation, the disclosure is not limited thereto and the remote system 120 and/or the media transport system 125 may be configured to enact any privacy preferences, privacy protections, disclosure regulations, and/or the like without departing from the disclosure.

Figure 13:
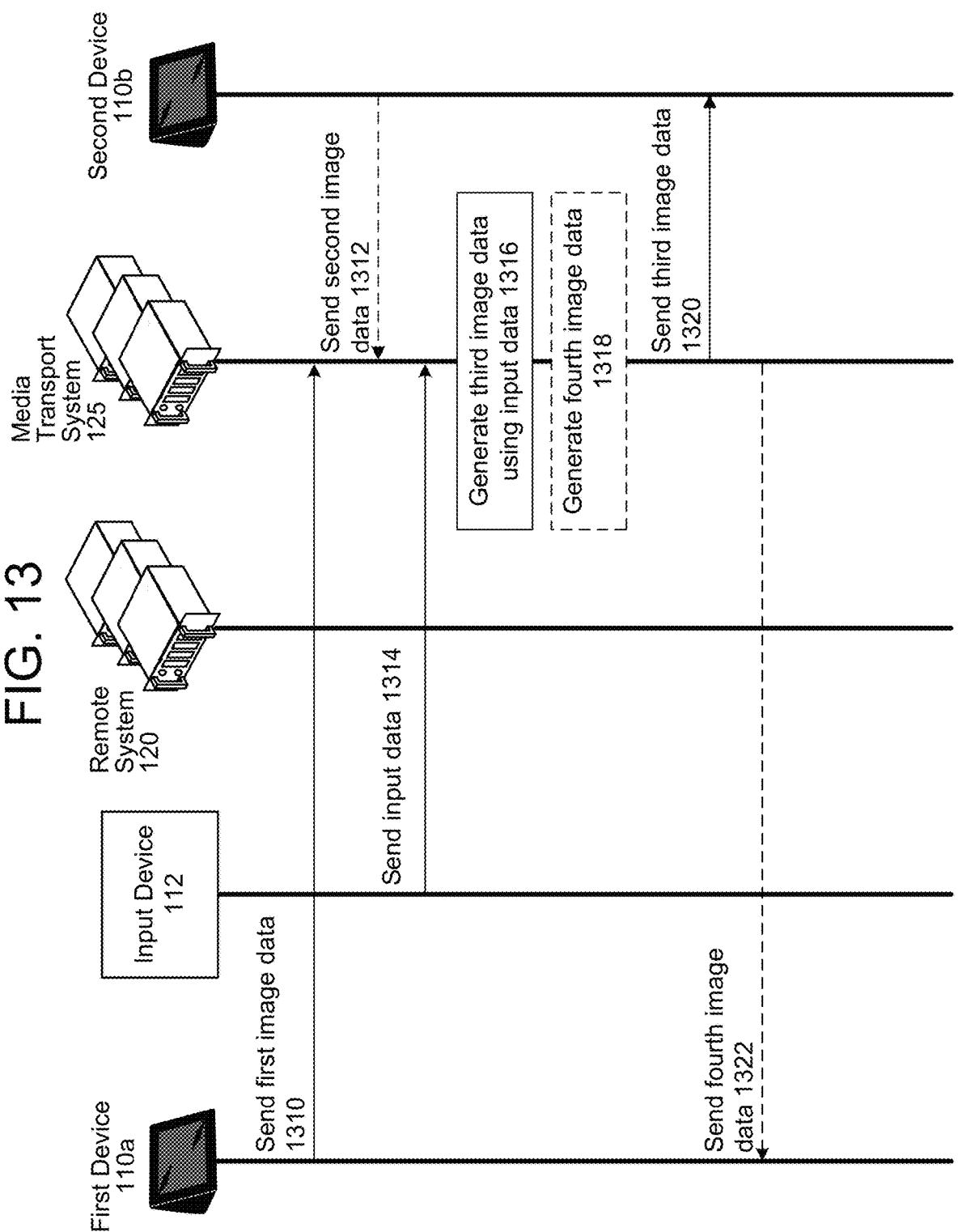
FIG. 13 is a communication diagram illustrating an example of generating output image data using input data from an input device according to embodiments of the present disclosure.

FIG. 13 is a communication diagram illustrating an example of generating output image data using input data from an input device according to embodiments of the present disclosure. As illustrated in FIG. 13, the first device 110a may send (1310) first image data to the media transport system 125, the second device 110b may send (1312) second image data to the media transport system 125, and the input device 112 may send (1314) input data to the media transport system 125. For example, the first device 110a, the second device 110b, and/or the input device 112 may send the data to the media transport system 125 using the media routing components 330 described in greater detail above.

The media transport system 125 may receive the first image data, the second image data, and/or the input data, may generate (1316) third image data using the input data, may optionally generate (1318) fourth image data, may send (1320) the third image data to the second device 110b, and may optionally send (1322) the fourth image data to the first device 110a. For example, the media transport system 125 may generate the third image data using the first image data, the second image data, and the input data, as described above with regard to FIGS. 8-9B. However, the disclosure is not limited thereto and in some examples, the media transport system 125 may generate the third image data using the first image data and the input data without departing from the disclosure.

Similarly, the media transport system 125 may optionally generate the fourth image data using the first image data, the second image data, and/or the input data. For example, the media transport system 125 may generate the fourth image data with positions of the first image data and the second image data reversed, such that a first image represented by the first image data is a smaller window within a second image represented by the second image data and the input data is overlaid above the second image. However, the disclosure is not limited thereto, and the media transport system 125 may generate the fourth image data with the input data overlaid above the first image, without the first image data, without the input data, and/or the like without departing from the disclosure. As indicated by the dashed lines, steps 1318 and 1322 are optional because the media transport system 125 may not generate the fourth image data and/or send the fourth image data to the first device 110a without departing from the disclosure.

Figure 14:
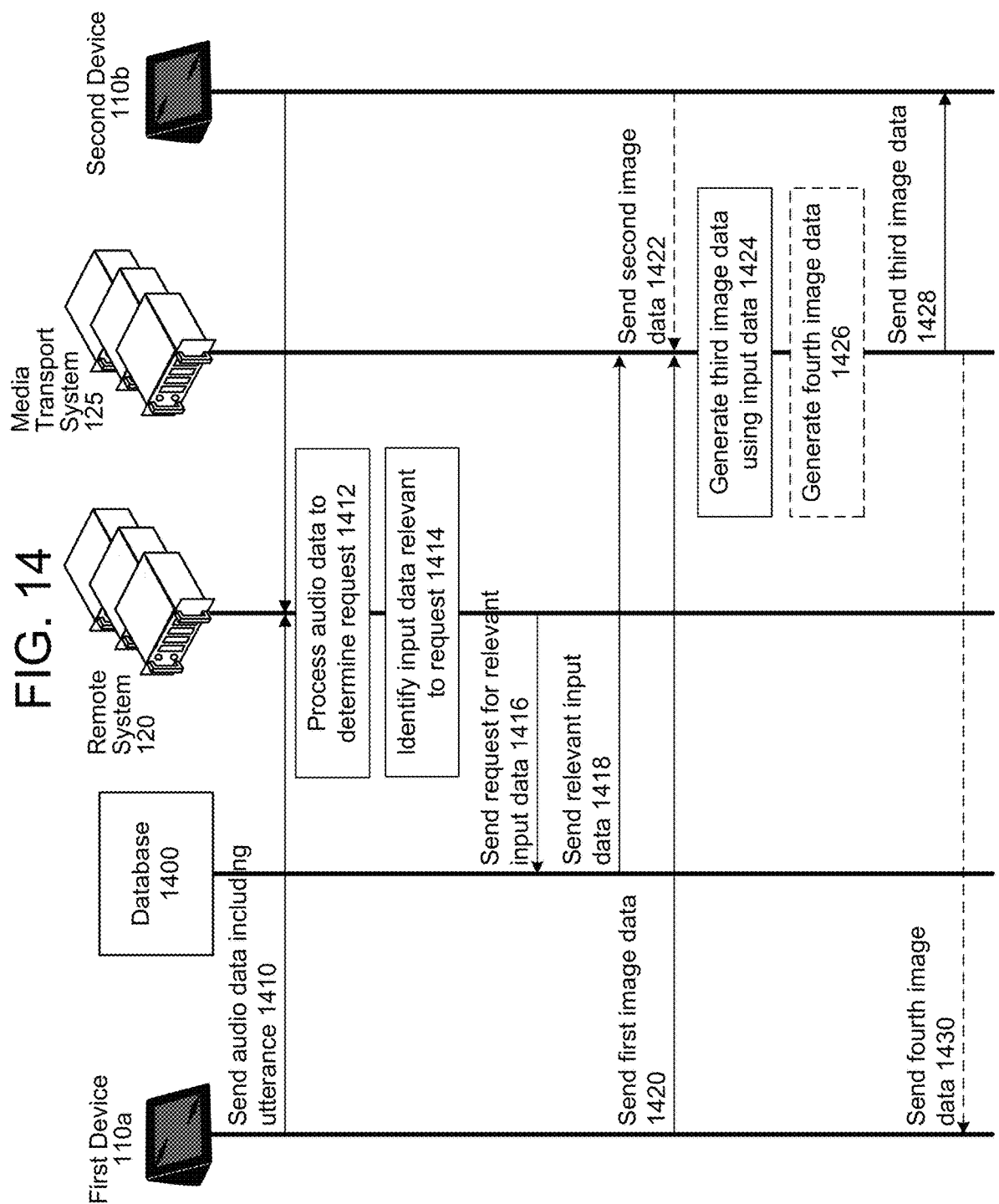
FIG. 14 is a communication diagram illustrating an example of generating output image data using input data from a database according to embodiments of the present disclosure.

FIG. 14 is a communication diagram illustrating an example of generating output image data using input data from a database according to embodiments of the present disclosure. As illustrated in FIG. 14, the first device 110a or the second device 110b may send (1410) audio data including an utterance to the remote system 120. In some examples, the remote system 120 may monitor all audio data and process an utterance represented in the audio data without an explicit command to do so. However, the disclosure is not limited thereto and in other examples, the first device 110a and/or the second device 110b may detect a wakeword and, in response to detecting the wakeword, may generate the audio data and send the audio data to the remote system 120.

The remote system 120 may process (1412) the audio data to determine a request (e.g., perform speech processing to generate speech processing data), may identify (1414) input data relevant to the request (e.g., determine a portion of the input data indicated by the utterance), and may send (1416) a request for the relevant input data to a database 1400. For example, the database 1400 may store input data (e.g., measurement data, sensor data, etc.) associated with the input device 112 and the remote system 120 may send a request for a portion of the input data corresponding to a time window.

The database 1400 may send (1418) the relevant input data to the media transport system 125, the first device 110a may send (1420) first image data to the media transport system 125, and the second device 110b may optionally send (1422) second image data to the media transport system 125. After receiving the first image data, the second image data, and/or the relevant input data, the media transport system 125 may generate (1424) third image data using the input data, may optionally generate (1426) fourth image data, may send (1428) the third image data to the second device 110b, and may optionally send the fourth image data 1430 to the first device 110a, as described in greater detail above with regard to steps 1310-1322.

Figure 15:
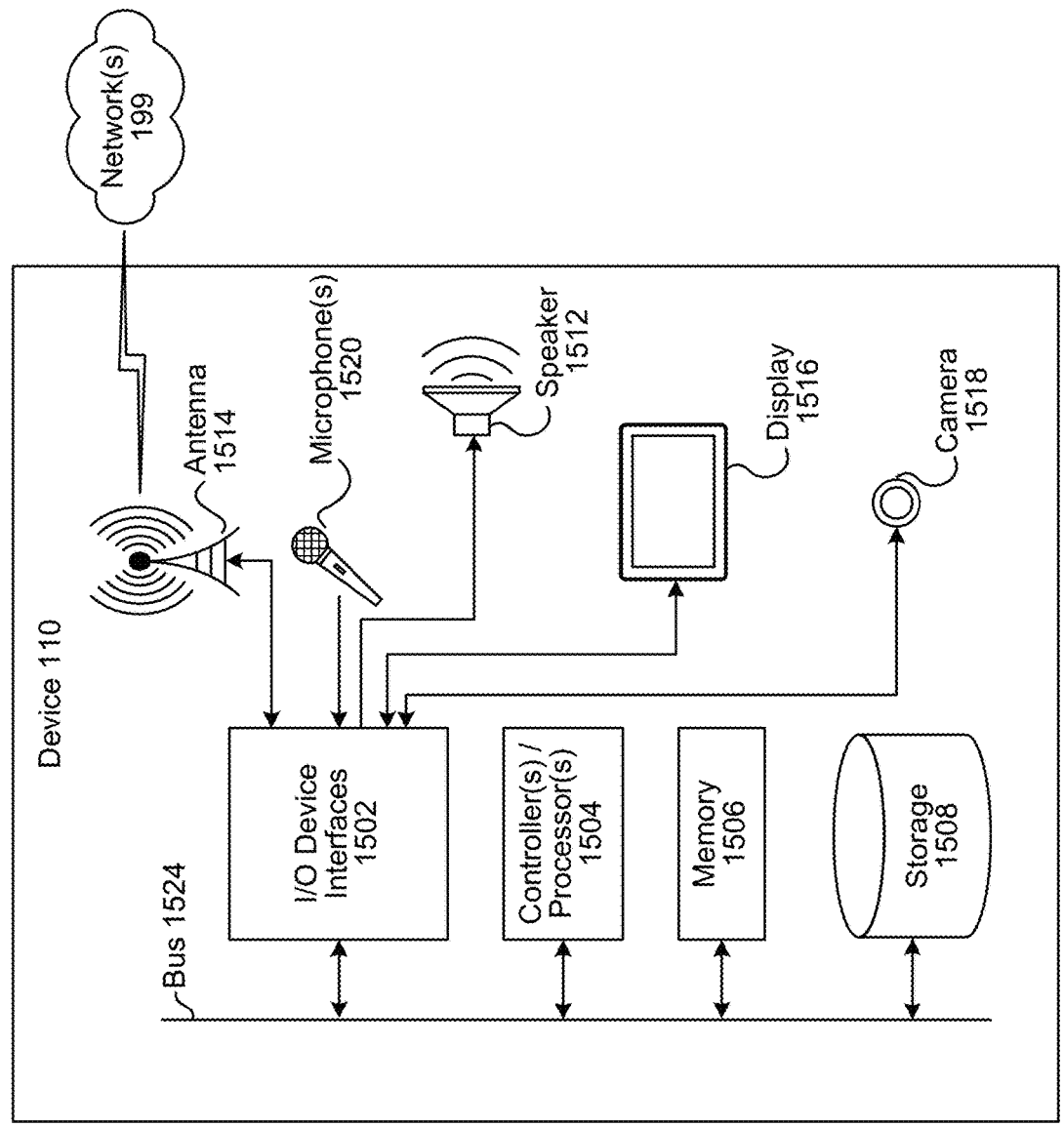
FIG. 15 is a block diagram conceptually illustrating example components of a device according to embodiments of the present disclosure.
Figure 16:
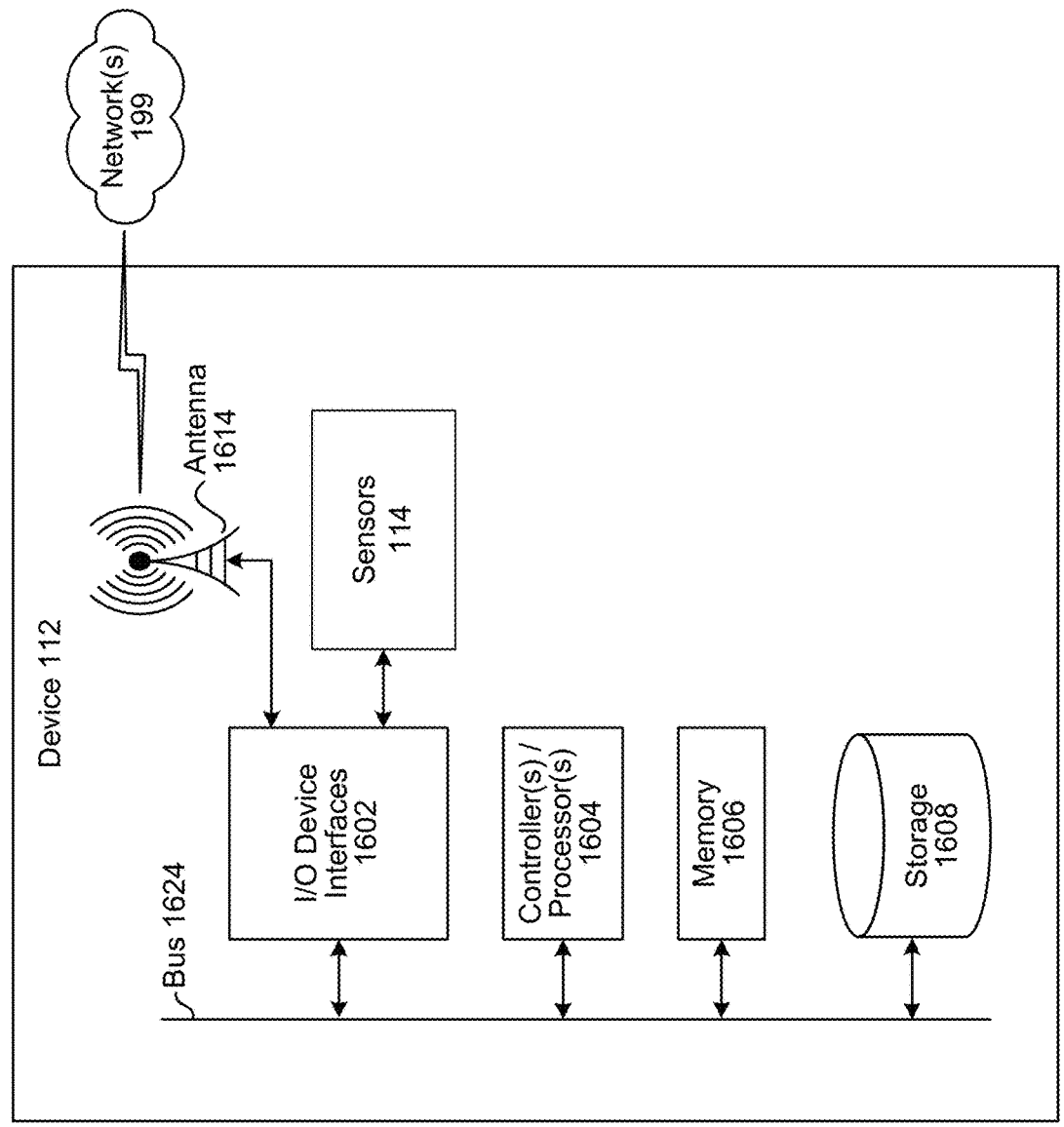
FIG. 16 is a block diagram conceptually illustrating example components of a device according to embodiments of the present disclosure.
Figure 17:
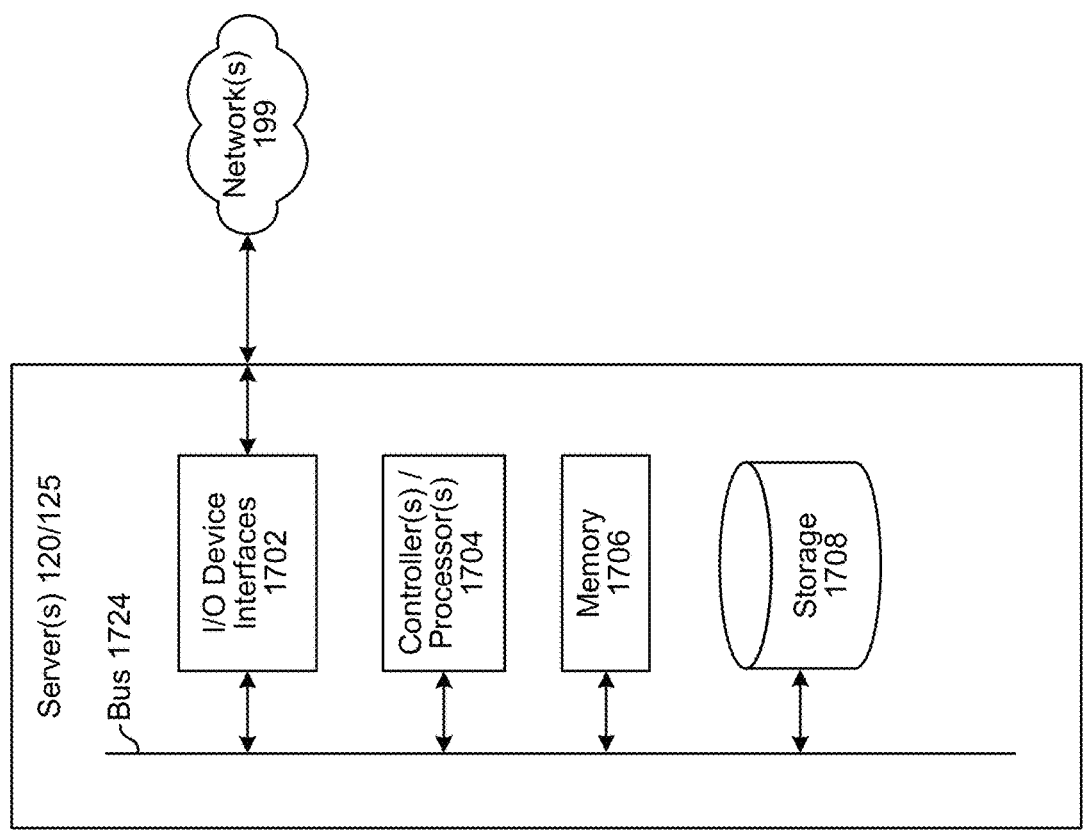
FIG. 17 is a block diagram conceptually illustrating example components of a system according to embodiments of the present disclosure.

FIG. 15 is a block diagram conceptually illustrating a device 110 that may be used with the system. FIG. 16 is a block diagram conceptually illustrating a device 112 that may be used with the system. FIG. 17 is a block diagram conceptually illustrating example components of the remote system 120/media transport system 125, which may be one or more servers and which may assist with ASR processing, NLU processing, etc. The term "system" as used herein may refer to a traditional system as understood in a system/client computing structure but may also refer to a number of different computing components that may assist with the operations discussed herein. For example, a server may include one or more physical computing components (such as a rack system) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server may be configured to operate using one or more of a client-system model, a computer bureau model, grid computing techniques, fog computing techniques, mainframe techniques, utility computing techniques, a peer-to-peer model, sandbox techniques, or other computing techniques.

Multiple servers may be included in the remote system 120 and/or the media transport system 125, such as one or more servers for performing ASR processing, one or more servers for performing NLU processing, etc. In operation, each of these server (or groups of devices) may include computer-readable and computer-executable instructions that reside on the respective server, as will be discussed further below.

Each of these devices/systems (110/112/120/125) may include one or more controllers/processors (1504/1604/1704), which may each include a central processing unit (CPU) for processing data and computer-readable instructions, and a memory (1506/1606/1706) for storing data and instructions of the respective device. The memories (1506/1606/1706) may individually include volatile random access memory (RAM), non-volatile read only memory (ROM), non-volatile magnetoresistive memory (MRAM), and/or other types of memory. Each device (110/112/120/125) may also include a data storage component (1508/1608/1708) for storing data and controller/processor-executable instructions. Each data storage component (1508/1608/1708) may individually include one or more non-volatile storage types such as magnetic storage, optical storage, solid-state storage, etc. Each device (110/112/120/125) may also be connected to removable or external non-volatile memory and/or storage (such as a removable memory card, memory key drive, networked storage, etc.) through respective input/output device interfaces (1502/1602/1702).

Computer instructions for operating each device/system (110/112/120/125) and its various components may be executed by the respective device's controller(s)/processor(s) (1504/1604/1704), using the memory (1506/1606/1706) as temporary "working" storage at runtime. A device's computer instructions may be stored in a non-transitory manner in non-volatile memory (1506/1606/1706), storage (1508/1608/1708), or an external device(s). Alternatively, some or all of the executable instructions may be embedded in hardware or firmware on the respective device in addition to or instead of software.

Each device/system (110/112/120/125) includes input/output device interfaces (1502/1602/1702). A variety of components may be connected through the input/output device interfaces (1502/1602/1702), as will be discussed further below. Additionally, each device (110/112/120/125) may include an address/data bus (1524/1624/1724) for conveying data among components of the respective device. Each component within a device (110/112/120/125) may also be directly connected to other components in addition to (or instead of) being connected to other components across the bus (1524/1624/1724).

Referring to FIG. 15, the device 110 may include input/output device interfaces 1502 that connect to a variety of components such as an audio output component such as a speaker 1512, a wired headset or a wireless headset (not illustrated), or other component capable of outputting audio. The device 110 may also include an audio capture component. The audio capture component may be, for example, a microphone 1520 or array of microphones, a wired headset, or a wireless headset, etc. If an array of microphones is included, approximate distance to a sound's point of origin may be determined by acoustic localization based on time and amplitude differences between sounds captured by different microphones of the array. The device 110 may additionally include a display 1516 for displaying content. The device 110 may further include a camera 1518.

Referring to FIG. 16, the device 112 (e.g., input device) may include input/output device interfaces 1602 that connect to a variety of components such as sensors 114. As described above, the device 112 may receive input data from any sensor 114 known to one of skill in the art, including measurement data (e.g., height, weight, temperature, heart rate, blood pressure, oxygen levels, etc.), which may be referred to as diagnostic data, and/or the like.

Via antenna(s) 1514/1614, the input/output device interfaces 1502/1602 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. The input/output device interfaces 1702 for the remote system 120/media transport system 125 may also connect to one or more networks 199 via a wired connection. Through the network(s) 199, the system may be distributed across a networked environment. The I/O device interface (1502/1602/1702) may also include communication components that allow data to be exchanged between devices such as different physical systems in a collection of systems or other components.

The components of the device(s) 110/112, the remote system 120, and the media transport system 125 may include their own dedicated processors, memory, and/or storage. Alternatively, one or more of the components of the device(s) 110/112, the remote system 120, or the media transport system 125 may utilize the I/O interfaces (1502/1602/1702), processor(s) (1504/1604/1704), memory (1506/1606/1706), and/or storage (1508/1608/1708) of the device(s) 110/112, the remote system 120, or the media transport system 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110/112, the remote system 120, and the media transport system 125, as described herein, are illustrative, and may be located as a stand-alone device or may be included, in whole or in part, as a component of a larger device or system.

Figure 18:
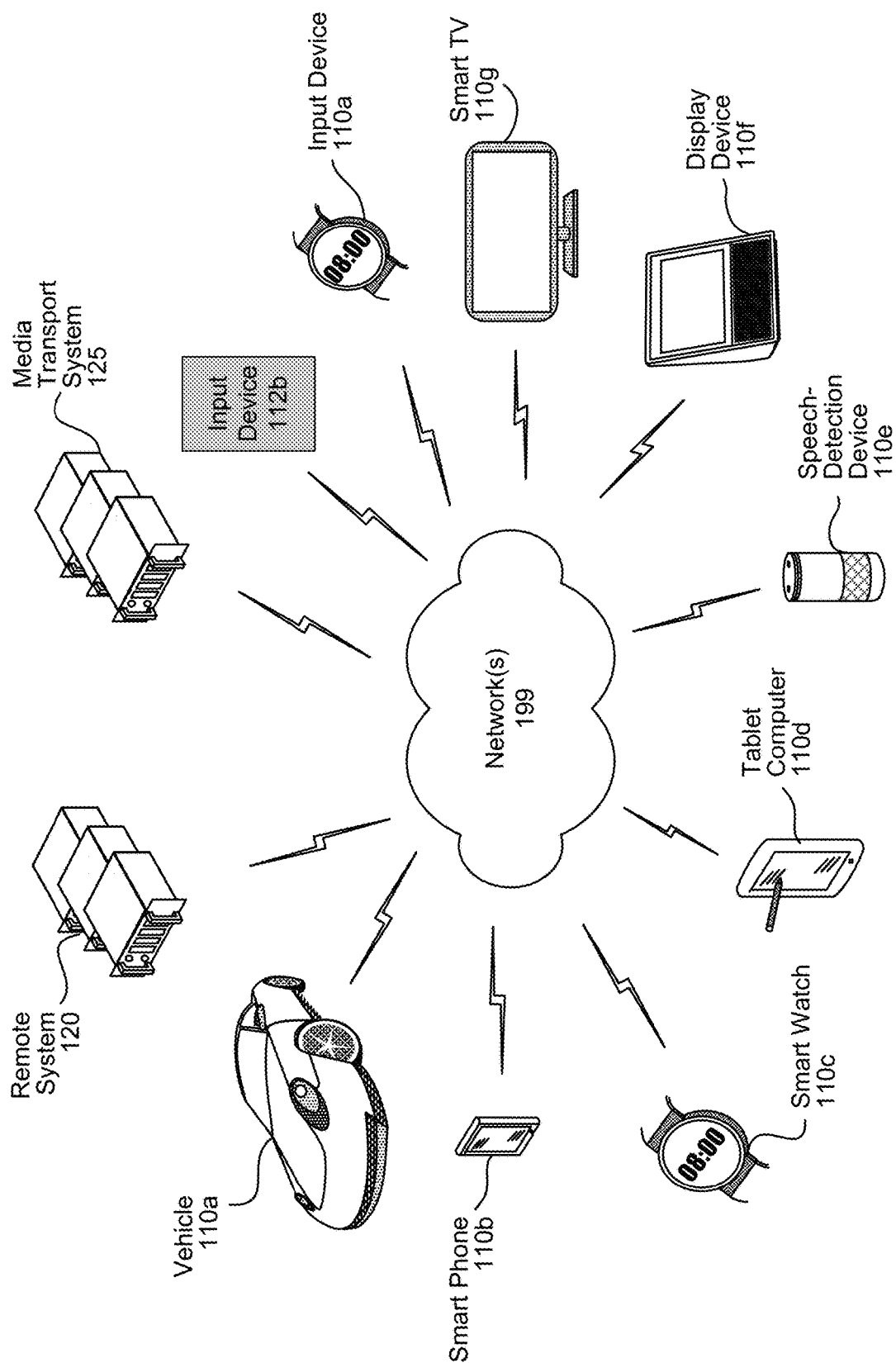
FIG. 18 illustrates an example of a network of devices according to embodiments of the present disclosure.

As illustrated in FIG. 18, multiple devices (110a-110g, 112a-112b, 120, 125) may contain components of the system, and the devices may be connected over a network(s) 199. The network(s) 199 may include a local or private network or may include a wide network such as the Internet. Devices may be connected to the network(s) 199 through either wired or wireless connections. For example, a vehicle 110a, a smart phone 110b, a smart watch 110c, a tablet computer 110d, a speech-detection device 110e, a display device 110f, a smart television 110g, an input device 112a (e.g., wearable device), and/or an input device 112b (e.g., sensors or the like) may be connected to the network(s) 199 through a wired connection, a wireless service provider, over a WiFi or cellular network connection, and/or the like. Any of the devices 110 may also be an input device 112 depending on the system configuration (e.g., the smart watch 110c may be used as an input device 112 without departing from the disclosure). Other devices are included as network-connected support devices, such as the remote system 120, the media transport system 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more systems 120.

The concepts disclosed herein may be applied within a number of different devices and computer systems, including, for example, general-purpose computing systems, speech processing systems, and distributed computing environments. The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
    establishing a communication session with a first device associated with a first user profile and a second device;
    determining first routing data for the first device during the communication session;
    determining second routing data for the second device during the communication session;
    sending the first routing data to the first device;
    sending the second routing data to the second device;
    receiving a command associated with the first user profile, the command corresponding to a request to include first data in the communication session, the first data originating from a third device associated with the first user profile;
    in response to receiving the command, determining third routing data indicating at least a first network address associated with the first device and a second network address associated with a processing component;
    in response to receiving the command, determining fourth routing data indicating at least the second network address and a third network address associated with the second device;
    using the third routing data and the fourth routing data to update the communication session to include the processing component;
    receiving first image data corresponding to the first device;
    receiving the first data;
    generating, using the first data, one or more graphical elements representing the first data;
    generating, by the processing component, second image data using the first image data and the one or more graphical elements; and
    sending the second image data to the second device.

2. The computer-implemented method of claim 1, wherein the first image data represents a first image, the method further comprising:
    receiving third image data from the second device, the third image data representing a second image;
    generating the second image data using the first image data, the third image data, and the one or more graphical elements, wherein the second image data represents the first image in a first portion of the second image data, the second image in a second portion of the second image data, and the first data as an overlay on top of the first image in a third portion of the second image data;
    generating fourth image data using the first image data, the second image data, and the one or more graphical elements, wherein the fourth image data represents the second image in a first portion of the fourth image data, the first image in a second portion of the fourth image data, and the first data as an overlay on top of the second image in a third portion of the fourth image data; and
    sending the fourth image data to the first device.

3. The computer-implemented method of claim 1, wherein receiving the first data further comprises:
    receiving, from the third device, the first data, wherein the communication session includes the first device, the second device, and the third device.

4. The computer-implemented method of claim 1, wherein receiving the first data further comprises:
  sending, to a storage component during a first time range, a request indicating the first user profile and a second time range prior to the first time range; and
  receiving, from the storage component in response to the request, the first data, wherein the first data corresponds to the second time range.

5. The computer-implemented method of claim 1, wherein receiving the first data further comprises:
  receiving, by a storage component during a first time range, the first data from the third device;
  storing, by the storage component, the first data and an association between the first data and the first user profile; and
  in response to receiving the command, receiving, from the storage component during a second time range, the first data.

6. The computer-implemented method of claim 1, wherein receiving the first data further comprises:
  receiving, by a storage component during a first time range, the first data from the third device, the third device associated with the first user profile;
  storing, by the storage component, the first data as part of second data associated with the first user profile;
  receiving, by a remote system, audio data corresponding to the communication session;
  processing the audio data to determine natural language understanding (NLU) data;
  determining that the NLU data corresponds to the first data; and
  receiving, from the storage component during a second time range, the first data.

7. A system comprising:
  at least one processor; and
  memory including instructions operable to be executed by the at least one processor to cause the system to:
    establish a communication session with a first device associated with a first user profile and a second device;
    receive a command associated with the first user profile, the command corresponding to a request to include in the communication session, the first data originating from a third device associated with the first user profile;
    receive first image data corresponding to the first device, the first image data representing a first image;
    receive second image data from the second device, the second image data representing a second image;
    receive the first data;
    generate, using the first data, one or more graphical elements representing the first data;
    generate third image data using the first image data, the second image data, and the one or more graphical elements, wherein the third image data represents the first data as a first overlay on top of the first image;
    generate fourth image data using the first image data, the second image data, and the one or more graphical elements, wherein the fourth image data represents the first data as a second overlay on top of the second image;
    send the third image data to the second device; and
    send the fourth image data to the first device.

8. The system of claim 7, wherein the memory further comprises instructions that, when executed by the at least one processor, further cause the system to:
  generate the third image data using the first image data, the second image data, and the one or more graphical elements, wherein the third image data represents the first image in a first portion of the third image data, the second image in a second portion of the third image data, and the first data as the first overlay on top of the first image in a third portion of the third image data; and
  generate fourth image data using the first image data, the second image data, and the one or more graphical elements, wherein the fourth image data represents the second image in a first portion of the fourth image data, the first image in a second portion of the fourth image data, and the first data as the second overlay on top of the second image in a third portion of the fourth image data.

9. The system of claim 7, wherein the memory further comprises instructions that, when executed by the at least one processor, further cause the system to:
  receive, prior to establishing the communication session, a request to begin the communication session;
  determine, using the request, that the communication session is to include at least the first device and the second device;
  determine first routing data for the first device during the communication session;
  determine second routing data for the second device during the communication session;
  send the first routing data to the first device; and
  send the second routing data to the second device.

10. The system of claim 9, wherein the memory further comprises instructions that, when executed by the at least one processor, further cause the system to:
  determine third routing data for the first device, the third routing data indicating at least a first network address associated with the first device and a second network address associated with a processing component configured to generate the third image data;
  determine fourth routing data for the second device, the fourth routing data indicating at least the second network address and a third network address associated with the second device; and
  use the third routing data and the fourth routing data to update the communication session with the first device and the second device to include the processing component.

11. The system of claim 7, wherein the memory further comprises instructions that, when executed by the at least one processor, further cause the system to:
  receive, from the third device, the first data, wherein the communication session includes the first device, the second device, and the third device.

12. The system of claim 7, wherein the memory further comprises instructions that, when executed by the at least one processor, further cause the system to:
  send, to a storage component during a first time range, a request indicating the first user profile and a second time range prior to the first time range; and
  receive, from the storage component in response to the request, the first data, wherein the first data corresponds to the second time range.

13. The system of claim 7, wherein the memory further comprises instructions that, when executed by the at least one processor, further cause the system to:
  receive, by a storage component during a first time range, the first data from the third device;

store, by the storage component, the first data and an association between the first data and the first user profile; and in response to receiving the command, receive, from the storage component during a second time range, the first data.

14. The system of claim 7, wherein the memory further comprises instructions that, when executed by the at least one processor, further cause the system to:

receive, by a storage component during a first time range, the first data from the third device, the third device associated with the first user profile;

store, by the storage component, the first data as part of second data associated with the first user profile;

receive, by a remote system, audio data corresponding to the communication session;

process the audio data to determine natural language understanding (NLU) data;

determine that the NLU data corresponds to the first data; and receive, from the storage component during a second time range, the first data.

15. A computer-implemented method, the method comprising:

establishing a communication session with a first device associated with a first user profile and a second device;

receiving audio data corresponding to the communication session;

processing the audio data to determine speech processing results data;

determining that the speech processing results data corresponds to a command associated with the first user profile, the command corresponding to a request to include first data in the communication session, the first data originating from a third device associated with the first user profile during a first time range;

receiving, from a storage component associated with the first user profile during a second time range, the first data;

generating, using the first data, one or more graphical elements representing the first data;

receiving first image data corresponding to the first device;

generating second image data using the first image data and the one or more graphical elements; and sending the second image data to the second device.

16. The computer-implemented method of claim 15, wherein establishing the communication session further comprises:

receiving a request to begin the communication session;

determining, using the request, that the communication session is to include at least the first device and the second device;

determining first routing data for the first device during the communication session;

determining second routing data for the second device during the communication session; and establishing the communication session with the first device and the second device using the first routing data and the second routing data.

17. The computer-implemented method of claim 15, further comprising:

in response to receiving the audio data, sending a notification to the first device requesting authorization to display the first data;

receiving input data from the first device indicating that the authorization is granted;

determining first routing data for the first device, the first routing data indicating at least a first network address associated with the first device and a second network address associated with a processing component configured to generate the second image data;

determining second routing data for the second device, the second routing data indicating at least the second network address and a third network address associated with the second device; and using the first routing data and the second routing data to update the communication session with the first device and the second device to include the processing component.

18. The computer-implemented method of claim 15, further comprising:

receiving, by the storage component prior to establishing the communication session, historical data from the third device, the historical data including the first data; and storing, by the storage component, the historical data and an association between the historical data and the third device.

19. The computer-implemented method of claim 15, wherein receiving the first data further comprises:

determining that the speech processing results data corresponds to the first user profile and a time range;

sending a request to the storage component, the request indicating the first user profile;

receiving, in response to the request, historical data from the storage component; and using the time range to select a portion of the historical data corresponding to the first data.

* * * * *